US005903905A

United States Patent [19]
Andersen et al.

[11] Patent Number: 5,903,905
[45] Date of Patent: May 11, 1999

[54] METHOD FOR SIMULTANEOUSLY CONSTRUCTING AND DISPLAYING A DYNAMIC PREVIEW OF A DOCUMENT THAT PROVIDES AN ACCURATE CUSTOMIZED DOCUMENT

[75] Inventors: Dennis R. Andersen, Issaquah; Vikram Nigaraj, Redmond; Douglas A. Ricard, Bellevue, all of Wash.

[73] Assignee: Microsoft Corporation, Redmond, Wash.

[21] Appl. No.: 08/649,838

[22] Filed: Apr. 30, 1996

[51] Int. Cl.⁶ .................................................. G06F 3/00
[52] U.S. Cl. .......................... 707/526; 707/527; 707/530
[58] Field of Search .................................. 707/502, 514, 707/515, 516, 526, 527, 530, 531; 345/335, 339, 433; 395/682, 683

[56] References Cited

U.S. PATENT DOCUMENTS

| | | | |
|---|---|---|---|
| 4,951,233 | 8/1990 | Fujiwara et al. | 707/525 |
| 5,003,499 | 3/1991 | Fujiwara et al. | 707/520 |
| 5,301,326 | 4/1994 | Linnett et al. | 395/882 |
| 5,499,366 | 3/1996 | Rosenberg | 707/4 |
| 5,528,740 | 6/1996 | Hill et al. | 345/428 |
| 5,537,526 | 7/1996 | Anderson et al. | 707/515 |
| 5,608,857 | 3/1997 | Ikeo et al. | 707/500 |
| 5,625,711 | 4/1997 | Nicholson et al. | 382/224 |
| 5,640,580 | 6/1997 | Slayden et al. | 707/527 |
| 5,649,216 | 7/1997 | Sieber | 707/506 |

OTHER PUBLICATIONS

Microsoft Office 6–in–1, New Edition, QUE Corporation, 1994, Screen Printouts A–C.

IBM Technical Disclosure Bulletin, vol. 33, No. 6A, Nov. 1990, "Architecture for Software User–Interface Software Development", pp. 483–485.

Microsoft Systems Journal, Nov. 1987, "Interprogram Communications Using Windows'Dynamic Data Exchange", pp. 13–38.

HP Journal 41 (1990) Apr., No. 2, "Developing a Distributed Network Management Application Using HP Open View Windows", pp. 85–91.

*Primary Examiner*—Stephen S. Hong
*Attorney, Agent, or Firm*—Jones & Askew, LLP

[57] ABSTRACT

A method for simultaneously constructing and displaying a dynamic preview display of a document. The method provides an accurate representation of the preview of the document and of the customized document itself. An initial preview display of the document is drawn displaying actual text as opposed to symbolic representations of text. A user then changes the characteristics of the preview display of the document and an updated preview display of the document is drawn after changing the characteristics of the preview display of the document. The update of the preview display is performed by the same drawing method used to draw the initial preview display of the document. Finally, an accurate customized document is output to an application program when there are no more desired changes to the characteristics of the preview display of the document. The output of the accurate customized document is performed by the same drawing method used to draw the initial preview display of the document and the updated preview of the document.

27 Claims, 23 Drawing Sheets

METHOD FOR SIMULTANEOUSLY CONSTRUCTING AND DISPLAYING A DYNAMIC PREVIEW OF A DOCUMENT THAT PROVIDES AN ACCURATE CUSTOMIZED DOCUMENT

TECHNICAL FIELD

This invention relates generally to methods for providing a user interface for selectively constructing a document while simultaneously creating a dynamic preview of the document. The method provides an accurate representation, storage, and manipulation of the preview of the document and of the customized document itself.

BACKGROUND OF THE INVENTION

Computer application programs have traditionally been used to create functional and professional looking documents. However, the process to create such quality documents can be time consuming, tedious, and beyond the skill set of some computer users depending on the complexity of the document.

Many computer application programs assist the computer user by supplying pre-existing default documents that the computer user can use as a starting point in an effort to make this creative process more efficient. The computer user is then responsible for any customizing of the document beyond the default style, textual content, textual attributes, layout, and graphical attributes of the pre-existing default document.

To implement this concept, application programs typically use specialized software tools or "wizards", such as those found in Microsoft Excel, Microsoft Publisher, and Microsoft Word 6.0, to assist the computer user in making choices of what characteristics of the document are desired. For example, the computer user could choose the type of font to apply to text within a document, or the computer user could choose the style of letterhead to appear at the top of the document in order to customize the document while using the software tool. These specialized software tools also draw a preview display of the pre-existing default document with it's associated characteristics. A preview display attempts to give the computer user an idea of what the document would look like before actually creating or outputting the document to an application program. Such specialized software tools for document creation are well known in the art and is the subject matter of U.S. Pat. No. 5,301,326.

Typically, the specialized software tools or "wizards" have document preview displays that are low resolution. The computer user is forced to imagine what the created customized document will look like in detail. Accordingly, errors may be displayed in the preview display yet are unrecognizable errors to the computer user. For example, lines may be used to symbolize the content of text. A computer user would not be able to recognize textual attribute errors or other layout errors. In other cases the text may be represented by lower resolution or "greeked" text where errors still may not be recognizable by the computer user.

Furthermore, the document in the preview display may have different characteristics than the customized document created by the application program. The computer user may not be guaranteed that all of the customized characteristics of the document that were selected or entered during the construction of the document using the "wizard" will show up in the created customized document. This is because different software code is used to create the preview display and to create the customized document by the application program.

Therefore, there is a need in the art for a method of simultaneously constructing and displaying a dynamic preview of a document that provides an accurate representation of a customized document using the same drawing process to initially draw the preview display, update the preview display, and to output the customized document to the application program.

SUMMARY OF THE PRESENT INVENTION

The present invention satisfies the above described needs by providing a system and method for simultaneously constructing and displaying a dynamic preview display of a document wherein the system and method provide an accurate representation of the preview of the document and the customized document itself. The method of the present invention draws an initial preview display of the document. The 35 method then changes characteristics of the preview display of the document and simultaneously updates the preview display of the document after changing any characteristics of the preview display of the document. The method of simultaneously drawing the updated preview display is performed by the same drawing method used to draw the initial preview display of the document. Finally, the method outputs an accurate customized document when finished changing the characteristics of the preview display of the document. The method of outputting the accurate customized document is performed by the same drawing method used to draw the initial preview display of the document and the updated preview of the document.

More particularly described, the method of the present invention draws characteristics of a document which include style, textual content, textual attributes, layout, and graphical attributes of the document. The method also draws actual text as opposed to symbolic representations of text. Finally, the method draws the characteristics of the document in both the preview display and the output by directing a plurality of objects to draw themselves. These objects contain current information concerning the characteristics of the preview display of the document with each of the objects being capable of drawing itself.

In another aspect, the present invention provides a computer system for simultaneously constructing and displaying a dynamic preview of a document that provides an accurate customized document. The system includes a central processing unit (CPU), an input device coupled to the CPU for constructing the dynamic preview of the document, and a display device coupled to the CPU for displaying the dynamic preview of the document. The CPU is operative to draw an initial preview display of the document on the display device. The CPU is also operative to change the characteristics of the preview display of the document and simultaneously update the preview display of the document after any changes to the characteristics have been made. Finally, the CPU is operative to output a customized document when no further changes to the preview display of the document are desired. The process of outputting the customized document performed by the CPU being the same process used to draw the initial preview display of the document and update the preview display of the document.

More particularly described, the CPU of the computer system of the present invention is further operative to draw characteristics of a document which include style, textual content, textual attributes, layout, and graphical attributes of the document. The CPU is operative to draw actual text as opposed to symbolic representations of text. Finally, the CPU is also operative to draw the characteristics of the document in both the preview display and the output by directing a plurality of objects to draw themselves. These objects contain current information concerning the characteristics of the preview display of the document with each of the objects being capable of drawing itself.

It is therefore an object of the present invention to provide a method for simultaneously constructing and displaying a dynamic preview display of a document wherein the method provides an accurate representation of the preview of the document and the customized document itself.

It is a further object of the present invention to provide a method for displaying a preview of a document with actual text as opposed to symbolic representations of text.

It is a further object of the present invention to provide a method for drawing a preview display, updating the preview display, and drawing an output of the accurate customized document where the same process is used to draw the preview display, update the preview display, and output the accurate customized document.

It is a further object of the present invention to provide a method for drawing the characteristics of the document in both the preview display and the output by directing a plurality of objects containing information on document characteristics to draw themselves.

DETAILED DESCRIPTION OF THE PREFERRED EMBODIMENT

Figure 1:
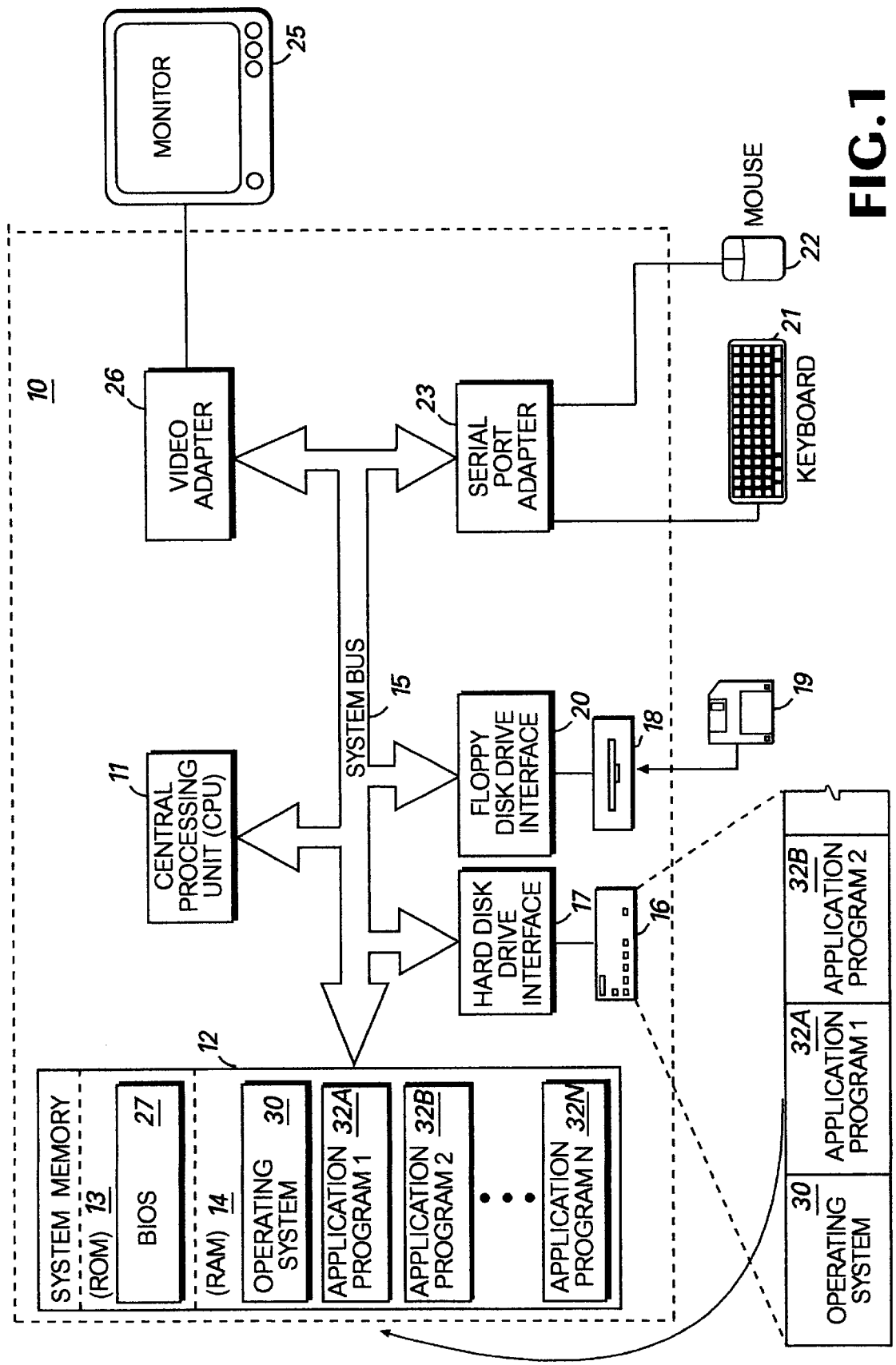
FIG. 1 is block diagram of a personal computer suitable for use in implementing the present invention.

The preferred embodiment of the present invention is directed to a system and method for simultaneously constructing and displaying a dynamic preview of a document. The system and method provide an accurate representation of the preview of the document and of the customized document itself. The preferred embodiment is implemented in an application program that runs on a personal computer. The present invention updates a high resolution preview display of the document under construction as changes are made. The present invention also uses the same drawing process to initially draw the preview display, to update the preview display, and to output the customized document to the application program.

Although the preferred embodiment will be generally described in the context of an application and an operating system running on a personal computer, those skilled in the art will recognize that the present invention also can be implemented in conjunction with other operating systems for other types of computers. Accordingly, it will be understood that the terms "application program", "operating -system", and "computer" generally include all types of computers, operating systems, and application programs designed for them.

Turning first to the nomenclature of the specification, the detailed description which follows is represented largely in terms of processes and symbolic representations of operations by conventional computer components, including a central processing unit (CPU), memory storage devices for the CPU, and connected pixel-oriented display devices. These operations include the manipulation of data bits by the CPU and the maintenance of these bits within data structures resident in one or more of the memory storage devices. An example of such a data structure is an object which is a collection of data along with a standard set of operations. Such data structures impose a physical organization upon the collection of data bits stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, values, elements, symbols, characters, terms, numbers, records, objects, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, altering, changing, etc. which are often associated with manual operations performed by a human operator. The operations described herein are machine operations performed in conjunction with a human operator or user that interacts with the computer. The machines used for performing the operation of the present invention include general purpose digital computers or other similar computing devices.

In addition, it should be understood that the programs, processes, method, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now to the drawings, in which like numerals represent like elements throughout the several figures, the present invention and the preferred operating environment will be described.

The Operating Environment

FIGS. 1 illustrates various aspects of the preferred computing environment in which the present invention is designed to operate. Those skilled in the art will immediately appreciate that FIG. 1 and the associated discussion are intended to provide a brief, general description of the preferred computer hardware and operating system, and that additional information is readily available in the appropriate programming manuals, user's guides, and similar publications.

FIG. 1 illustrates a conventional IBM-compatible personal computer 10 suitable for implementing the present invention. As shown in FIG. 1, the personal computer 10 includes a central processing unit (CPU) 11, such as the 80486 or "PENTIUM" microprocessors manufactured by Intel Corporation of Santa Clara, Calif. The personal computer also includes system memory 12 (including read only memory (ROM) 13 and random access memory (RAM) 14), which is connected to the CPU by the system bus 15. A hard disk drive 16 is connected to the system bus 15 via the hard disk drive interface 17. A floppy disk drive 18, which is used to read or write a floppy disk 19, is connected to the system bus 15 via a floppy disk drive interface 20. Input devices such as a keyboard 21 and a mouse 22 are connected to the system bus 15 via a serial port adapter 23. A monitor 25 or other kind of display device is connected to the system bus 15 via a video adapter 26.

Although many other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as the operating system 30, application programs 32, and data are provided to the personal computer 10 via one of its memory storage devices, which may include the hard disk drive 16, floppy disk 19, RAM 14, ROM 13, and a CD-ROM (not shown).

In the preferred personal computer 10, the hard disk drive 16 is used to store data and programs, including the operating system and application programs.

When the personal computer 10 is turned on or reset, the Basic Input/Output System (BIOS) 27, which is stored in the ROM 13, instructs the CPU 11 to load the operating system 30 from the hard disk drive 16 into the RAM 14.

Once the operating system 30 is loaded into RAM 14, the CPU 11 executes the operating system code and causes the visual elements associated with the user interface of the operating system 30 to be displayed on the monitor 25. When an application program 32a is opened by a user, the program code and relevant data are read from the hard drive 16 and stored in the RAM 14. Furthermore, once a first application program 32a is opened by a user, the first application program 32a may also open another application program 32b to perform some specialized task.

The preferred embodiment of the present invention is designed to operate in conjunction with Microsoft Corporation's "Windows 95" and "Windows NT" operating systems. However, it should be understood that the invention can readily be implemented in other operating systems, such as Microsoft Corporation's "Windows 3.1" operating system, IBM Corporation's "OS/2" operating system, and the operating system used in "MACINTOSH" computers manufactured by Apple Computer, Inc.

Those skilled in the art will understand that operating systems may be implemented as an object-oriented operating environment. As previously mentioned, objects are collections of data along with a set of standard operations performed by the object on the collection of data. Objects can be arranged in shared libraries typically located in either a specific application program 32a or in the operating system 30 itself.

The operating system 30 also provides a variety of functions or services that allow an application program 32a to easily deal with various types of input/output (I/O). This allows an application program 32a to issue relatively simple function calls that cause the operating system to perform all of the steps required to accomplish various tasks. Similarly, objects communicate with both the operating system 30 and application programs 32 using relatively simple function calls and more complex interprocess communications.

The preferred embodiment of the present invention is "Microsoft Works version 4.0 for Windows 95" which is an integrated word processor, spreadsheet, drawing, communications, and database application program, which is published by Microsoft Corporation. Briefly described, the preferred application program provides an integrated solution of the essential productivity tools for the "Windows 95" and "Windows NT" operating systems. The preferred application program is graphical, and takes advantage of the graphical power of the "Windows 95" and "Windows NT" operating systems. This gives the user visual access to the documents and simple, direct ways to view and manipulate document information.

At this point, it should be appreciated that operating systems, such as the "Windows 95" and "Windows NT" operating systems, are quite complex and provide a wide variety of services that allow users and application programs to utilize the resources available in the personal computer. Those skilled in the art will be familiar with operating systems and their various features, which include, but are in no means limited to, the specific messages and functions described above. For more comprehensive information regarding the "Windows 95" and "Windows NT" operating systems and their interaction with application programs, the reader may refer to any of a variety of publications, including "Win32 Programmer's Reference" and "Advanced Windows", both published by Microsoft Press which are incorporated herein by reference.

Likewise, those skilled in the art will appreciate that the preferred application program, "Microsoft Works version 4.0 for Windows 95" provides a wide variety of features and functions in addition to those included in the brief description presented above. For additional information regarding the "Microsoft Works version 4.0 for Windows 95" application program, the reader may refer to the documentation that is distributed with Version 4.0 of the application program. This documentation is incorporated herein by reference.

Figure 2A:
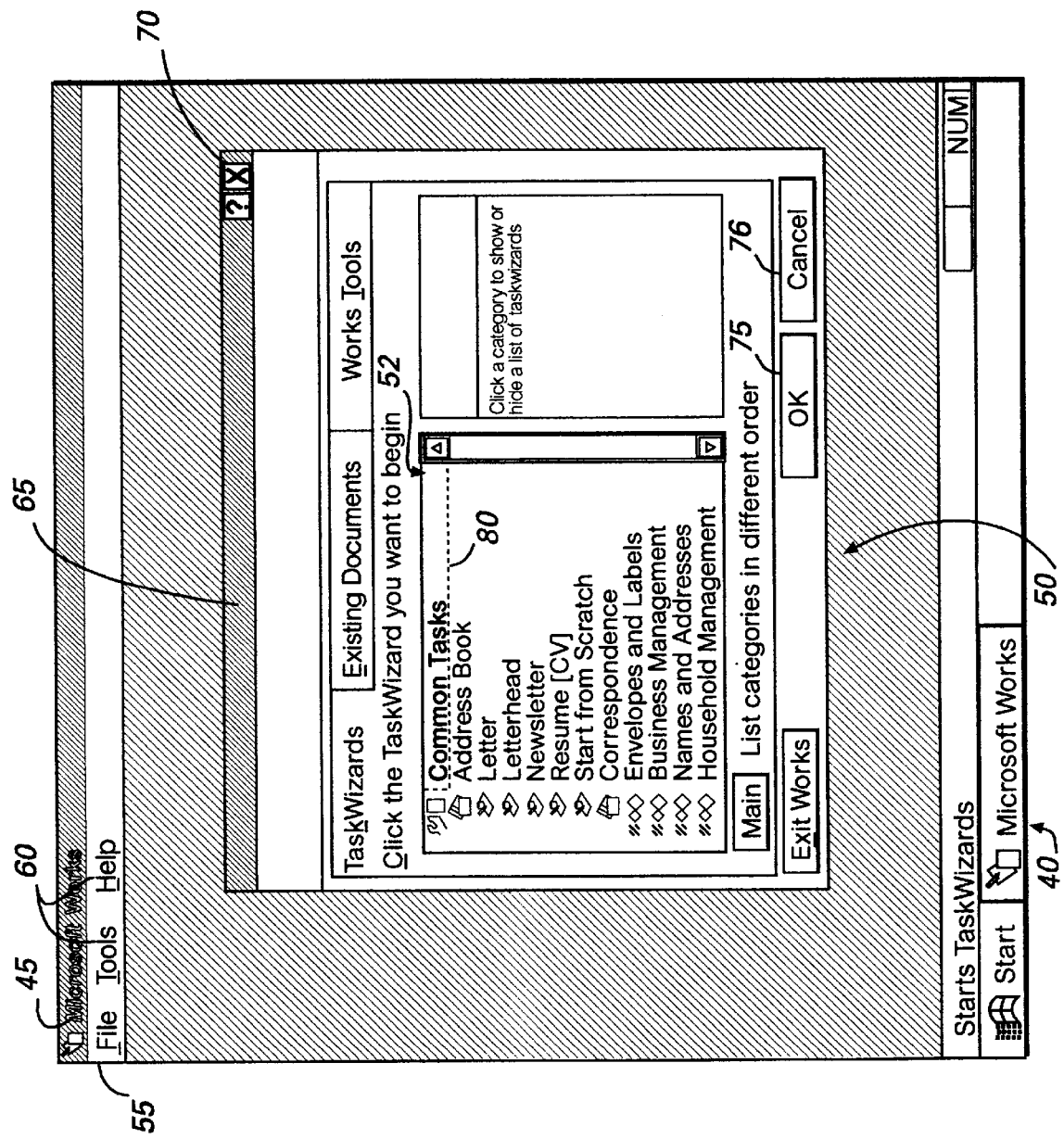
FIG. 2A–2N are screen displays illustrating the preferred method of simultaneously constructing and displaying a dynamic preview of a document wherein the method provides an accurate representation of the preview of the document and of the customized document itself.
Figure 3:
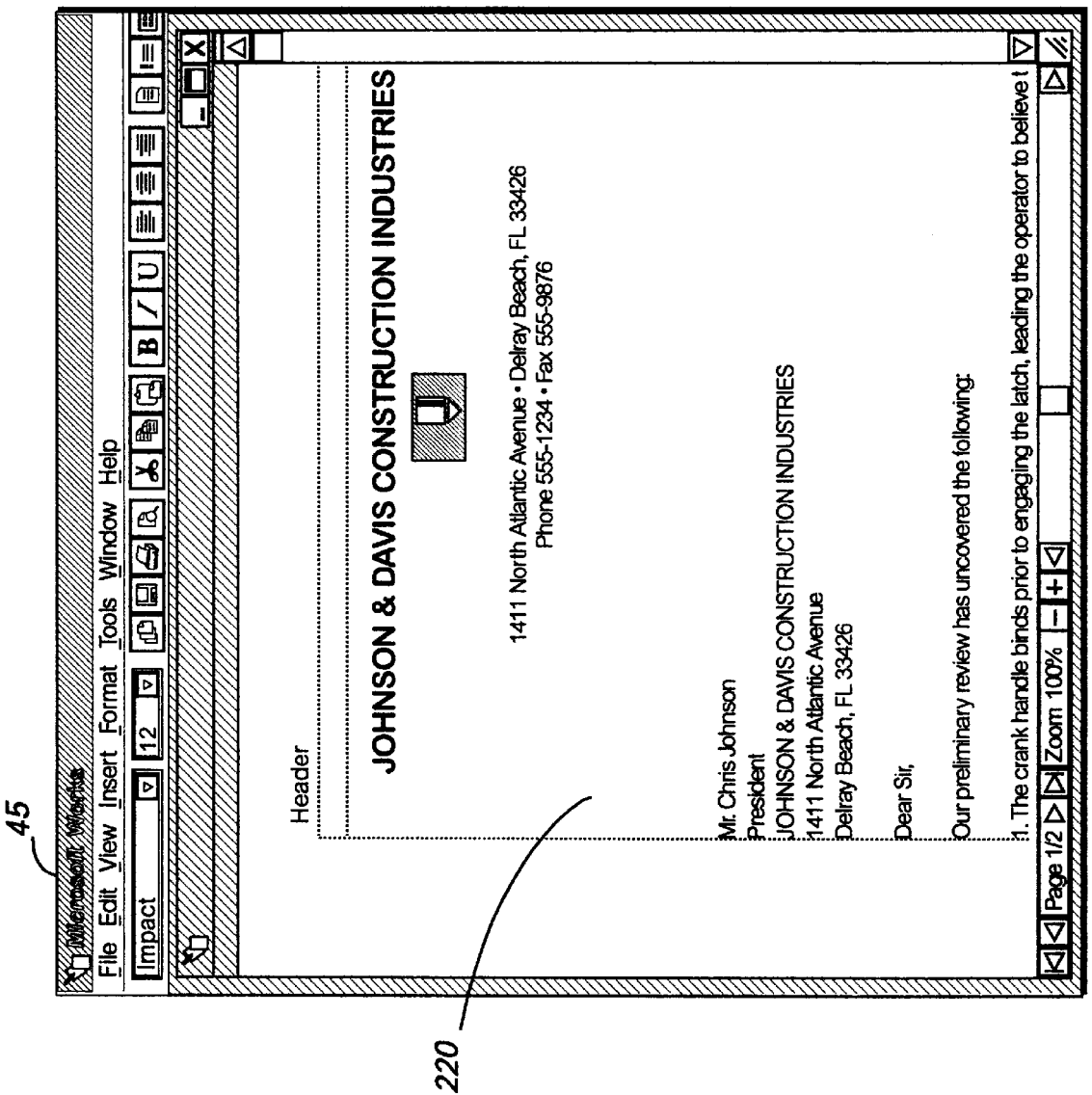
FIG. 3 is a screen display illustrating the accurate customized customized document in an application program.
Figure 4:
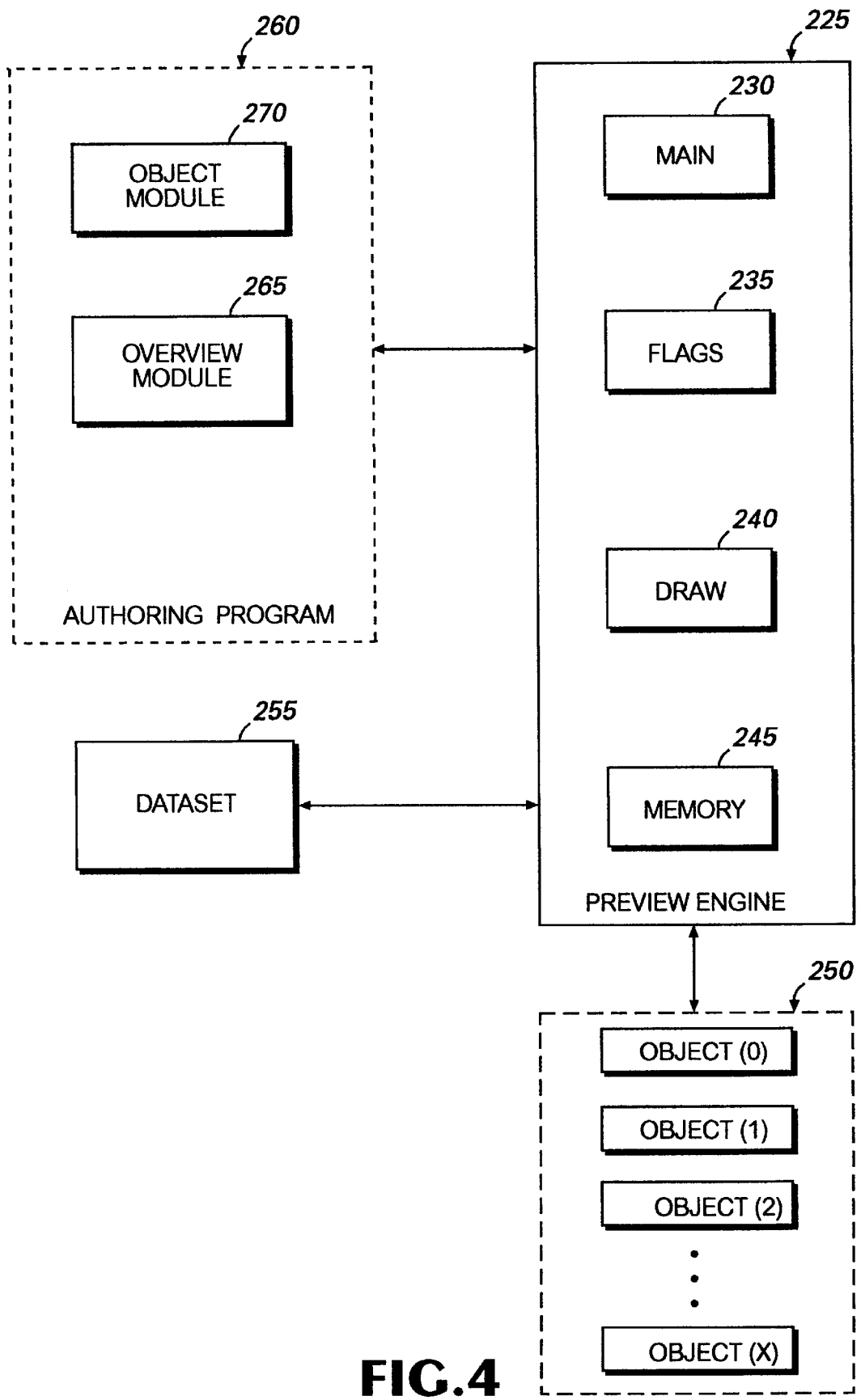
FIG. 4 is a block diagram showing the dataset authoring environment for the preferred method of the present invention.
Figure 5:
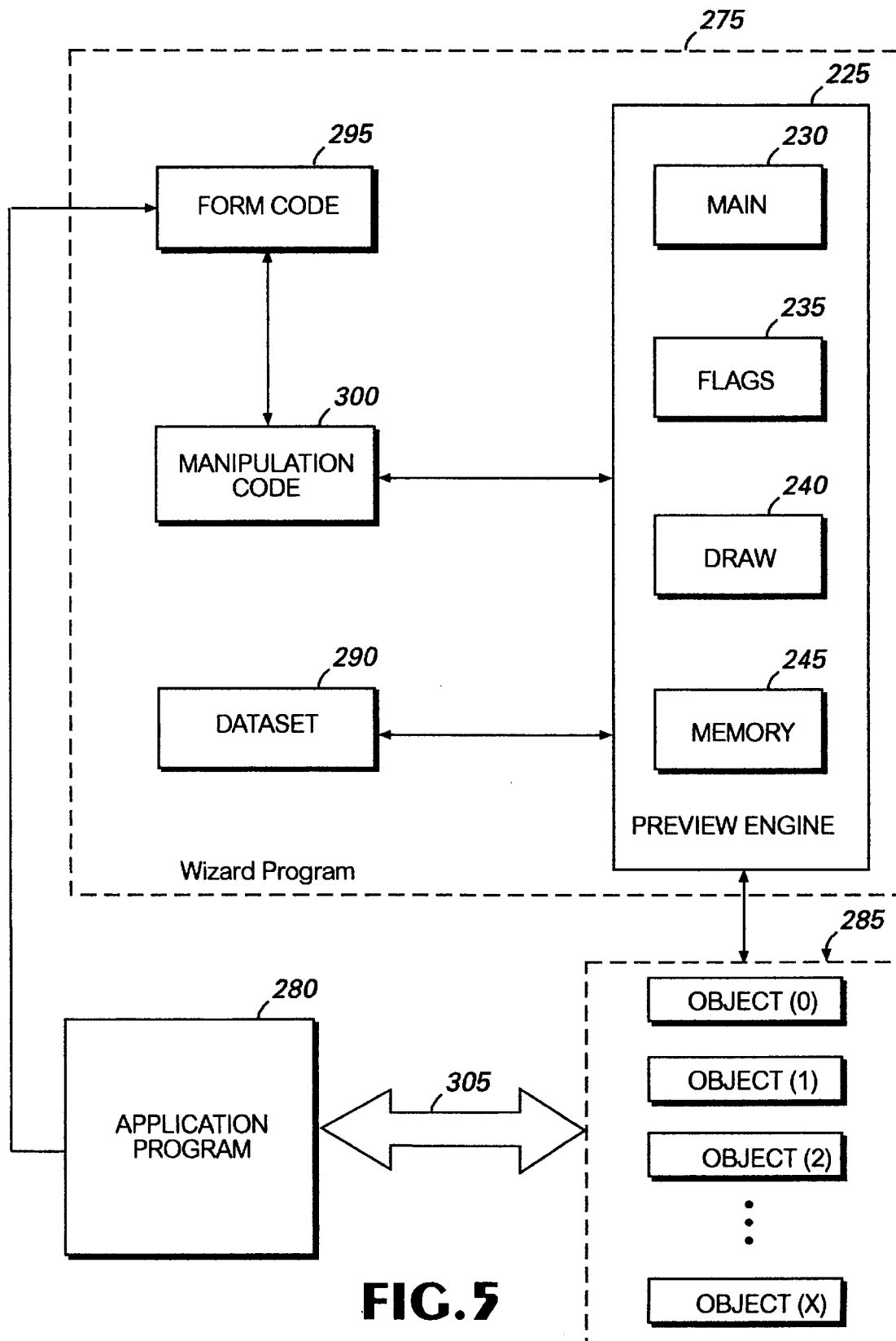
FIG. 5 is a block diagram showing the run-time environment for the preferred method of the present invention.
Figure 6:
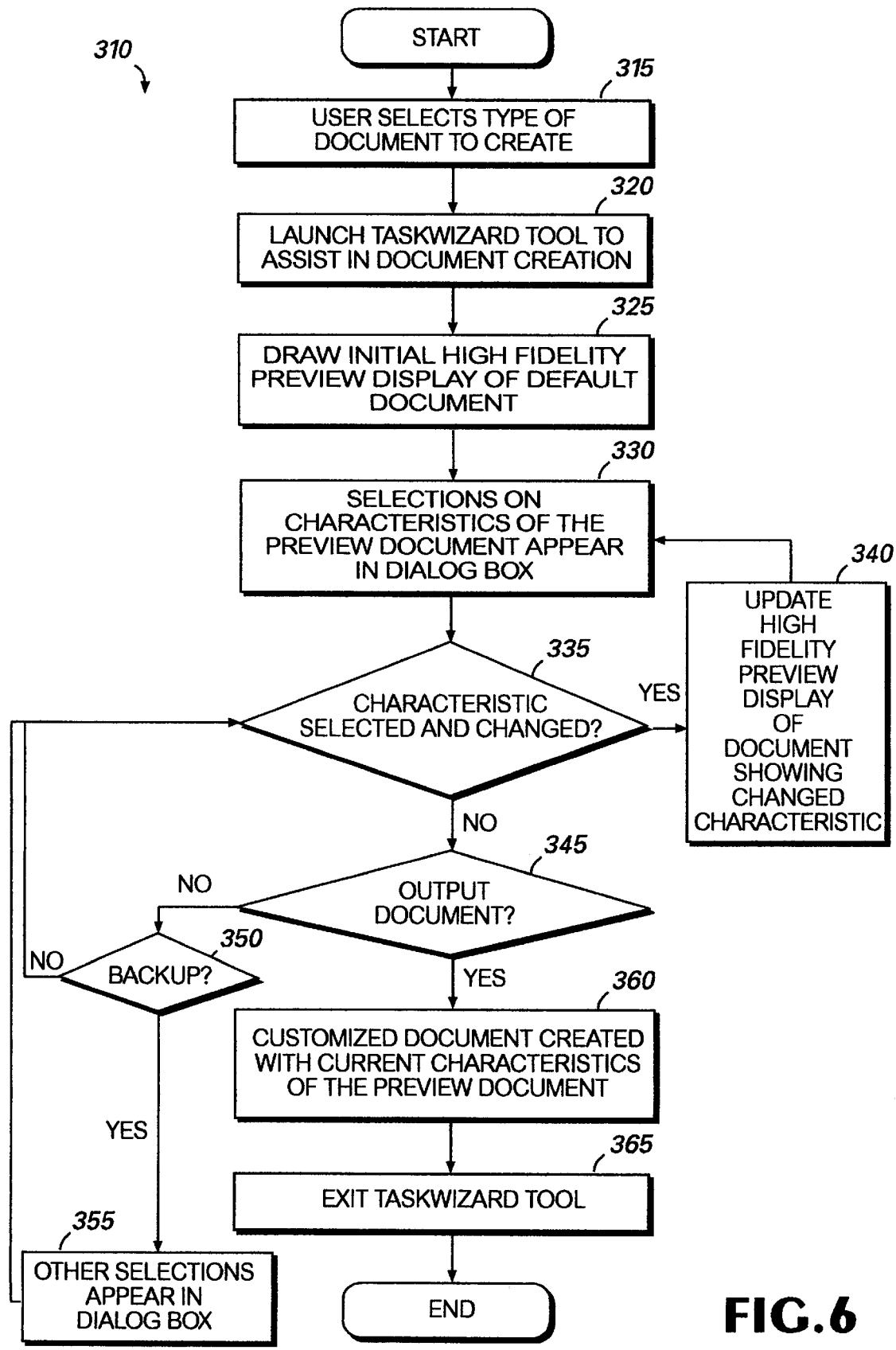
FIG. 6 is a flow diagram illustrating the method of the present invention as perceived by a user.

The Preferred Methods For Simultaneously Constructing and Displaying a Dynamic Preview of a Document Turning now to FIGS. 2–7, the preferred method for simultaneously constructing and displaying a dynamic preview of a document that provides an accurate customized document will be described. FIGS. 2A–2N and FIG. 3 are printouts of screen displays illustrating the method of the preferred embodiment of the present invention. FIG. 4 illustrates a diagram of the preferred dataset authoring environment. FIG. 5 illustrates a diagram of the preferred run-time environment for the preferred method of the present invention. FIG. 6 is a flow diagram of the steps taken by the user in order to simultaneously construct and display a dynamic preview of the document. FIG. 7A–7D is a flow diagram illustrating the method of the preferred embodiment of the present invention as implemented by an application program on a personal computer.

FIGS. 2A–2N and FIG. 3 (collectively referred to as "the screen printouts") show a window 40 associated with the preferred application program 45. In particular, the screen printouts show a wizard dialog window 50 with choices from which the user can select.

Those skilled in the art will be familiar with most of the elements shown in the screen printouts. A menu bar 55, which includes a variety of pull down menus 60, is displayed along the top edge of the window 40. A title bar 65 displays the title on the wizard dialog window 50. Control boxes 70 are located at the top right corner of the wizard dialog window 50. The "OK" operational selection box 75 and the "Cancel" operational selection box 76 appear at the bottom of the wizard dialog window 50.

Referring now to FIG. 2A, the preferred embodiment of the present invention will be described. The user chooses a predetermined document type 80 from the list of document type choices 52 in the wizard dialog window 50. The user then either selects the "OK" operational selection box 76 or double-clicks on the predetermined document type 80 to begin constructing a document of the type selected.

Figure 2B:
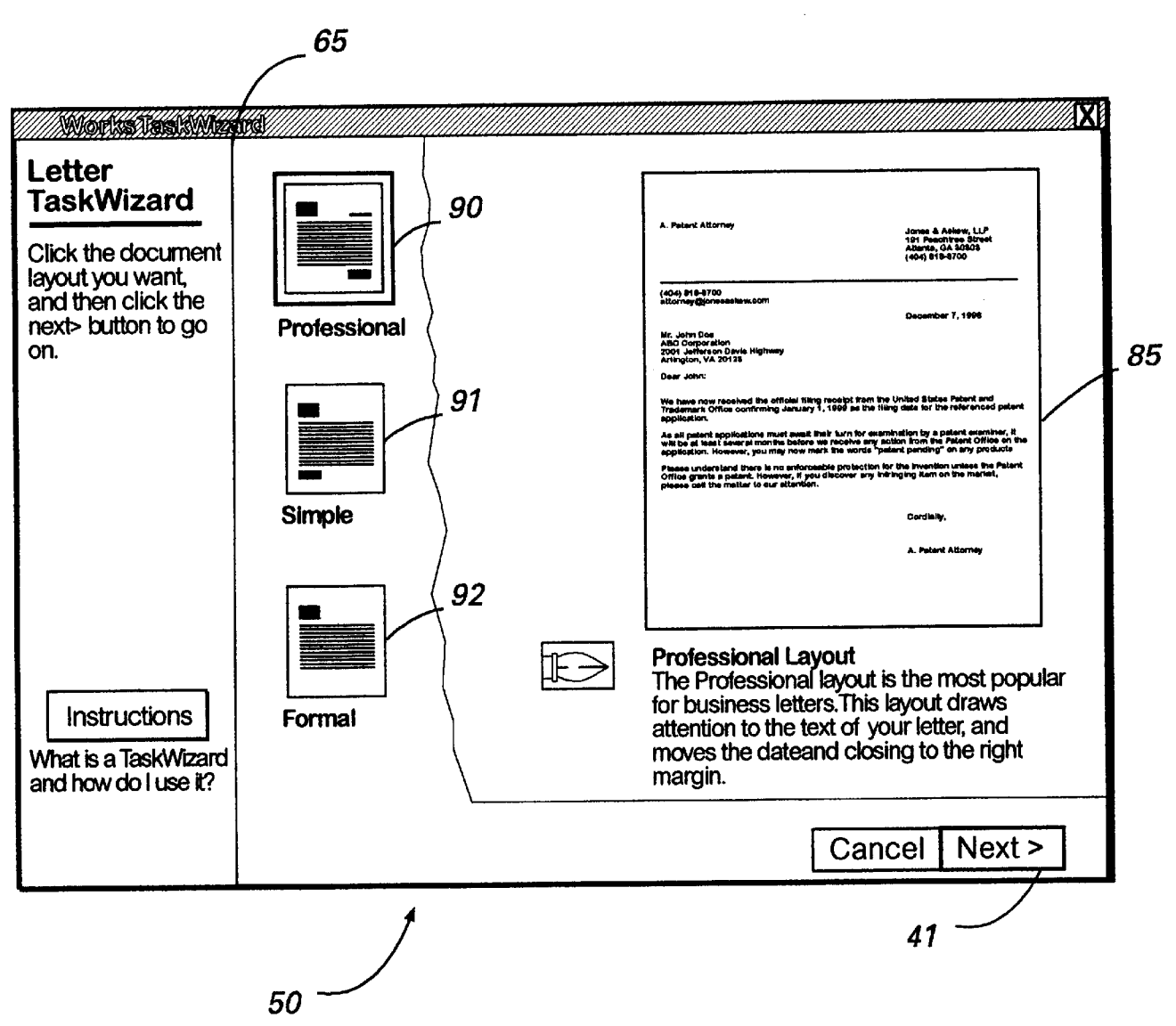

As shown in FIG. 2B, a preview display 85 of the predetermined document type 80 appears on the right hand side of the wizard dialog window 50. The preview display 85 is shown with default document characteristics such as style, textual content, textual attributes, layout, and graphical attributes of the document. Document characteristic choices 90–92 are displayed within the wizard dialog window 50 from which the user can select. When one of the document characteristics 90–92 is selected and changed, the preview display 85 of the document is simultaneously updated to reflect the recent change in selected document characteristics. For example, the user may select "professional" characteristic 90 to begin the creation of a customized document. After selecting "professional" characteristic 90, the user then selects the "Next" operational selection box 41 to move to the next screen shown in FIG. 2C.

Figure 2C:
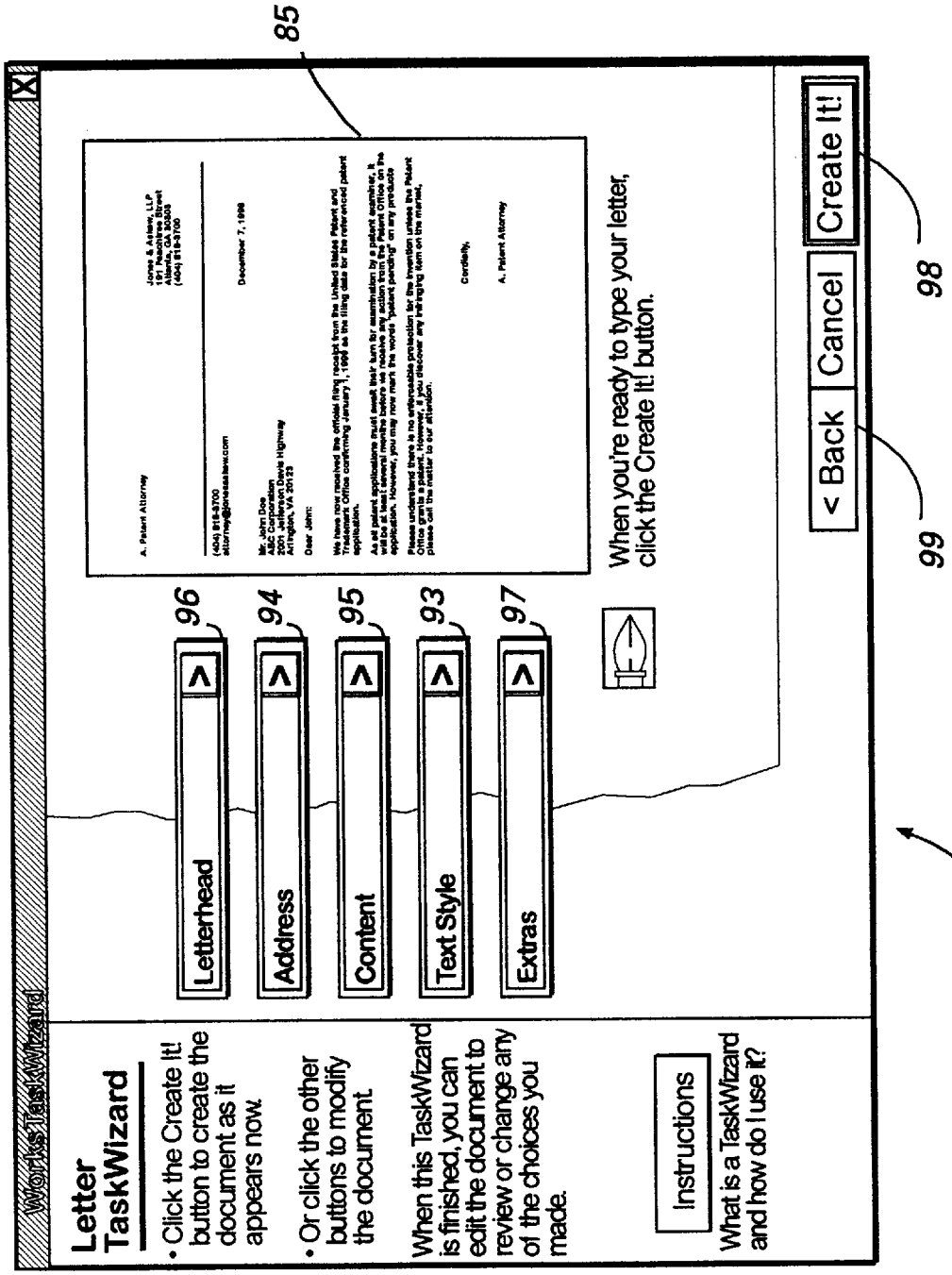

FIGS. 2C–2L illustrate how a specific document may be constructed and how specific changes to the document characteristics and corresponding preview displays 85 are updated. In FIG. 2C, additional document characteristic choices 93–97 are displayed for a "professional" letter document type in the wizard dialog window 50. The user may at any time during the choosing and previewing steps choose to output the document with the current document characteristics by selecting the "Create It!" box 98. Additionally, the user may choose to return to prior dialog box (FIG. 2B) by selecting the "Back" operational selection box 99.

Figure 2D:
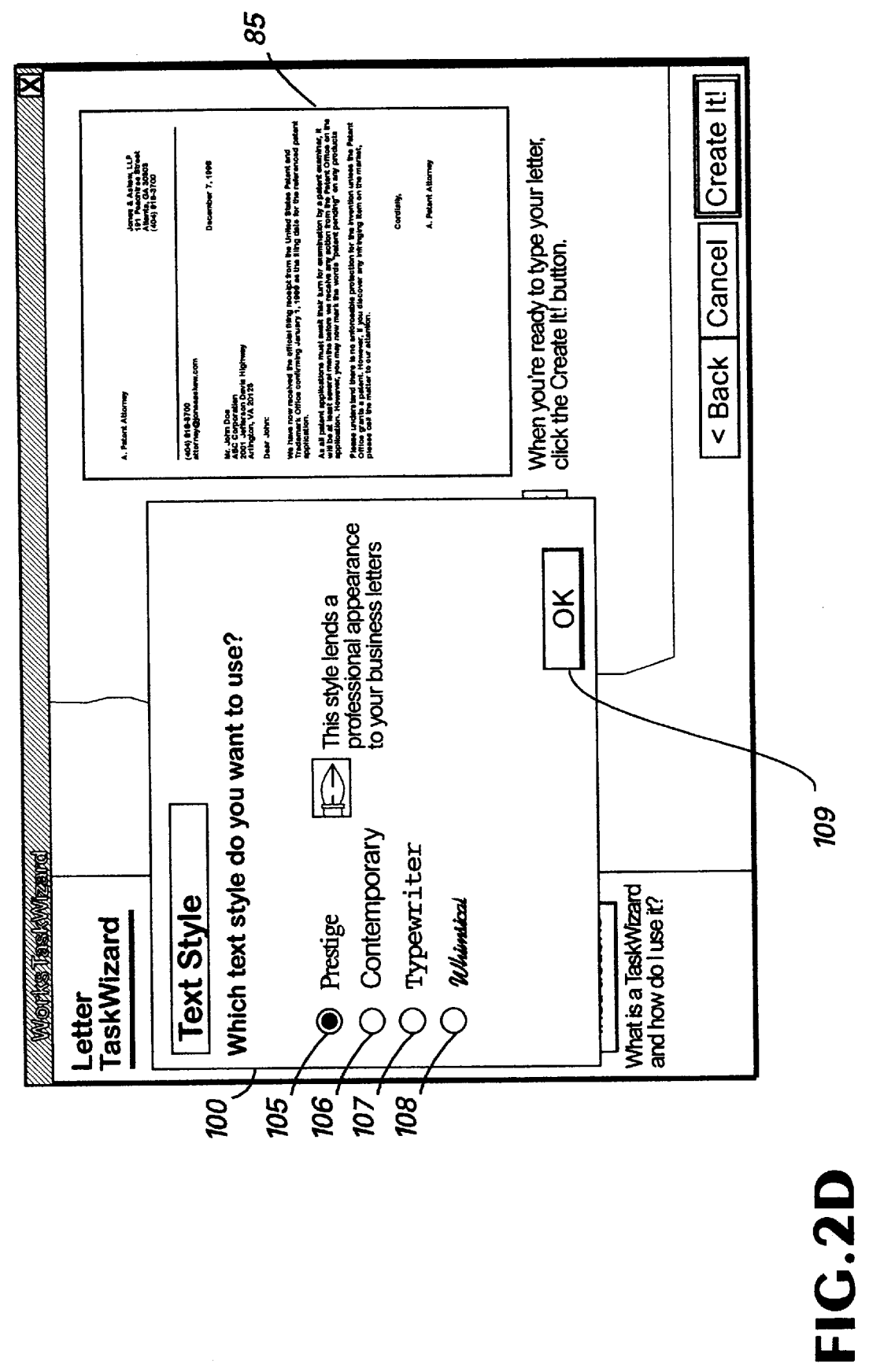

If the "Text Style" document characteristic 93 from FIG. 2C is selected, a Text Style dialog window 100 appears as shown in FIG. 2D. Different text style choices 105–108 are displayed to the user. The user selects the text style desired and then selects the "OK" operational selection box 109 to continue, and the preview display 85 of the document is updated for any change of text style.

Figure 2E:
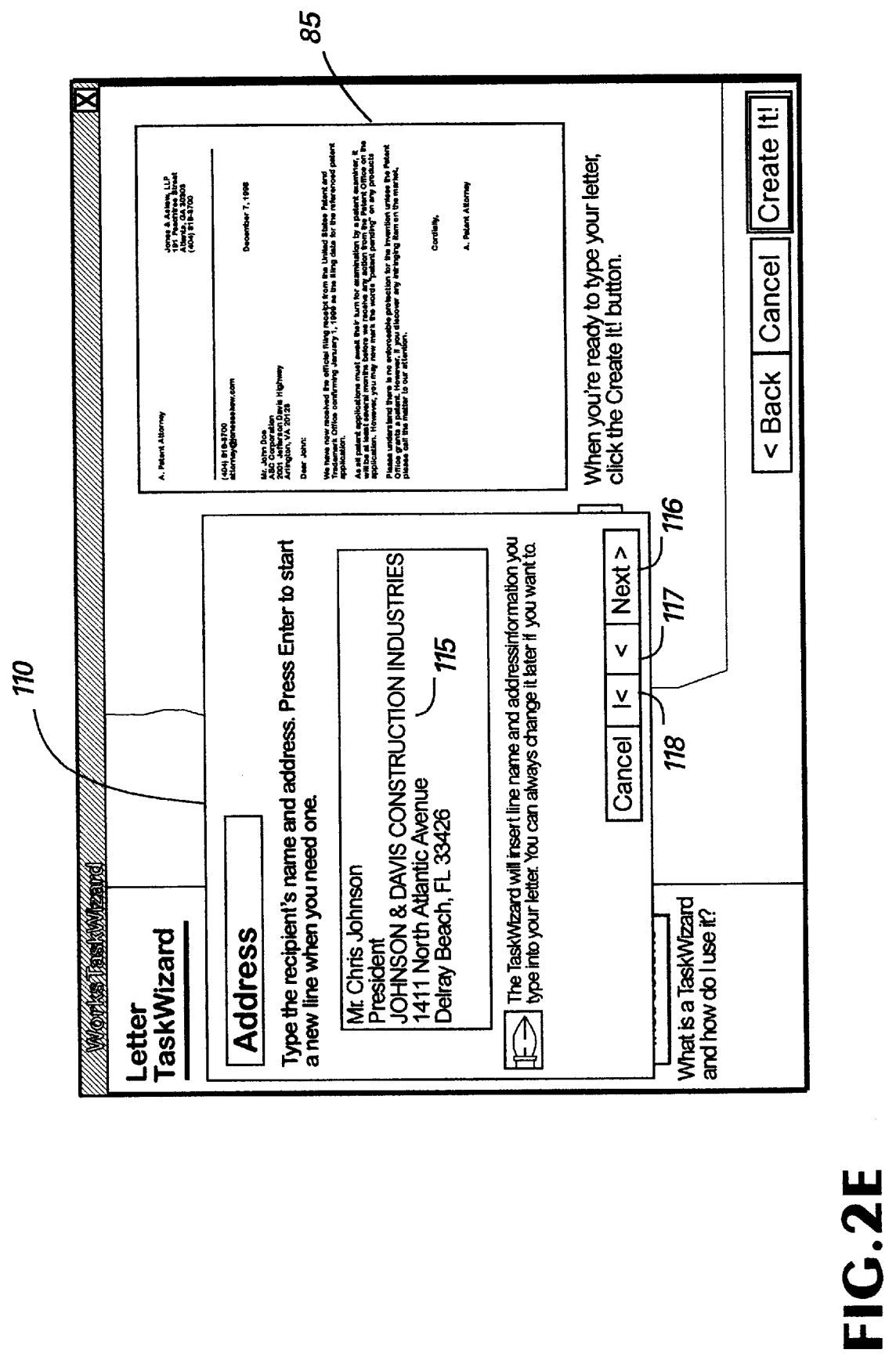
Figure 2F:
Figure 2C:
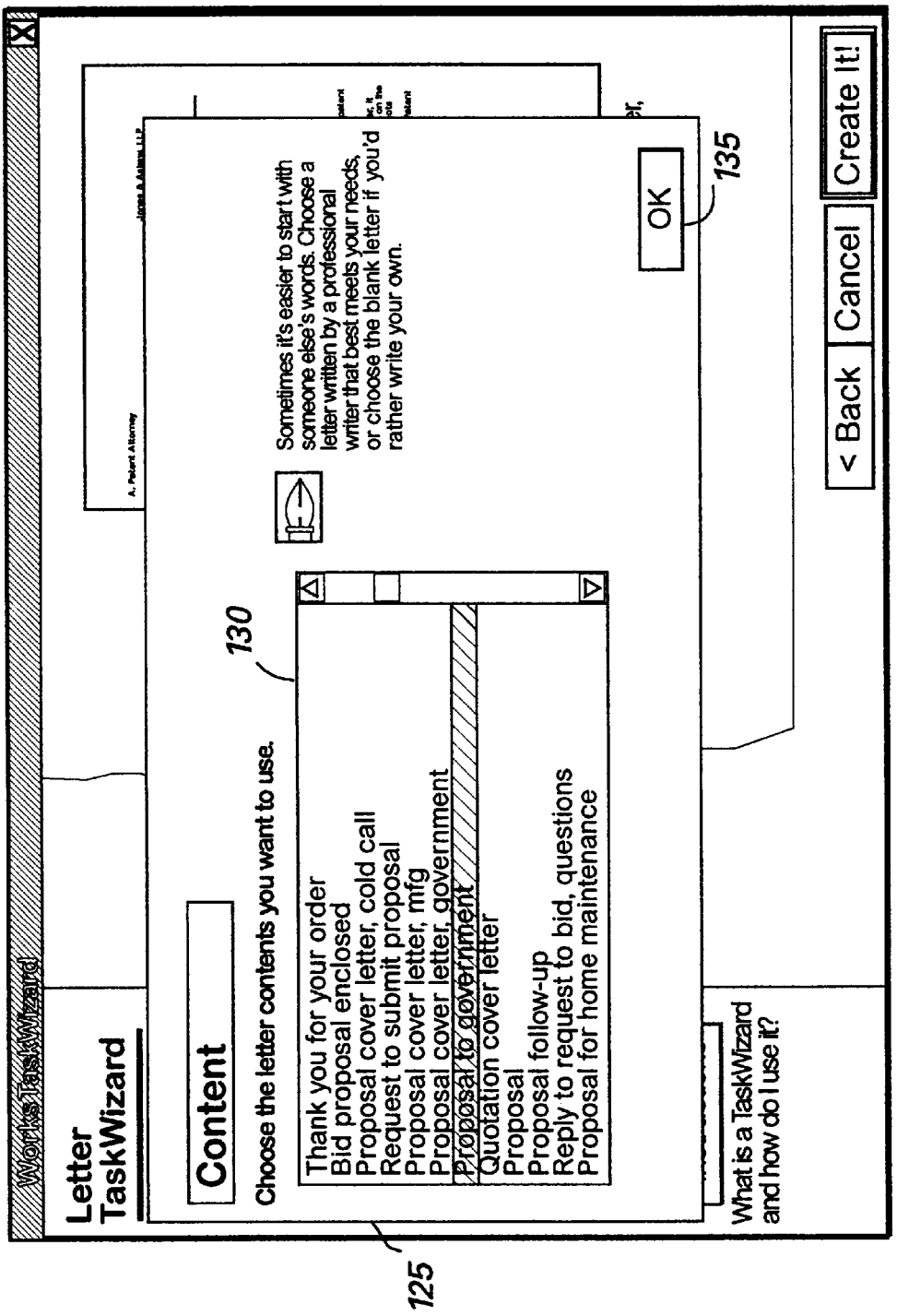

If the "Address" document characteristic 94 from FIG. 2C is selected, an Address dialog window 110 appears as shown in FIG. 2E. An address is typed in the data entry area 115. The user then selects the "Next" operational selection box 116 to continue or selects either the "<" operational selection box 117 or the "|<" operational selection box 118 to leave the Address dialog window and change other document characteristics. FIG. 2F illustrates the updated preview display 85 of the document reflecting the changed address document characteristic 94 from FIG. 2E. A comparison of the preview display 85 in FIG. 2F to the preview display 85 in FIG. 2C shows that the address text 120 has changed.

If the "Content" document characteristic 95 from FIG. 2C (or FIG. 2F) is selected, a Content dialog window 125 appears as shown in FIG. 2G. A list of different predetermined content choices 130 are displayed to the user. The user selects the content desired for the document and then selects the "OK" operational selection box 135 to continue and the preview display 85 of the document is updated for any change of content.

Figure 2H:
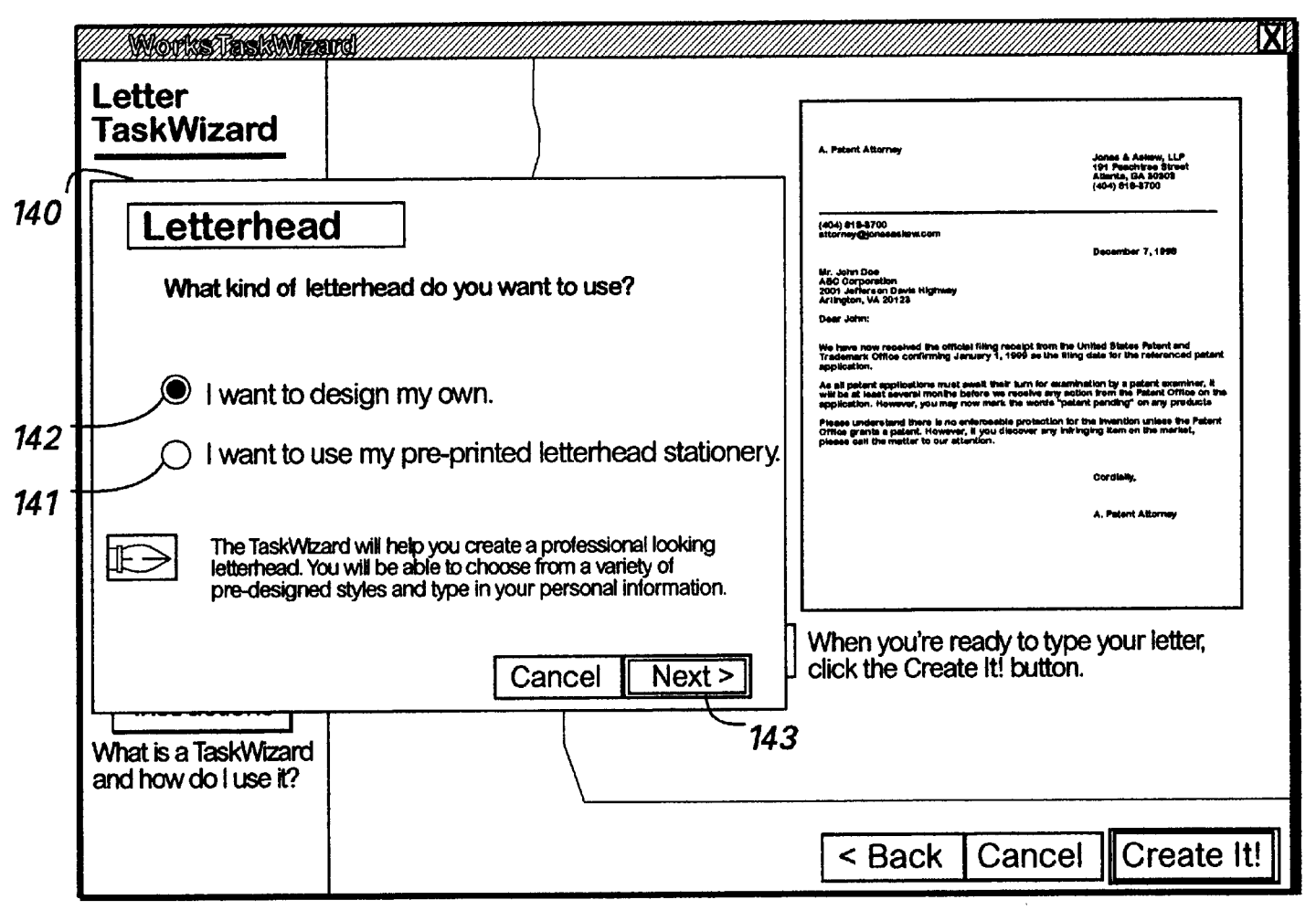
Figure 2J:
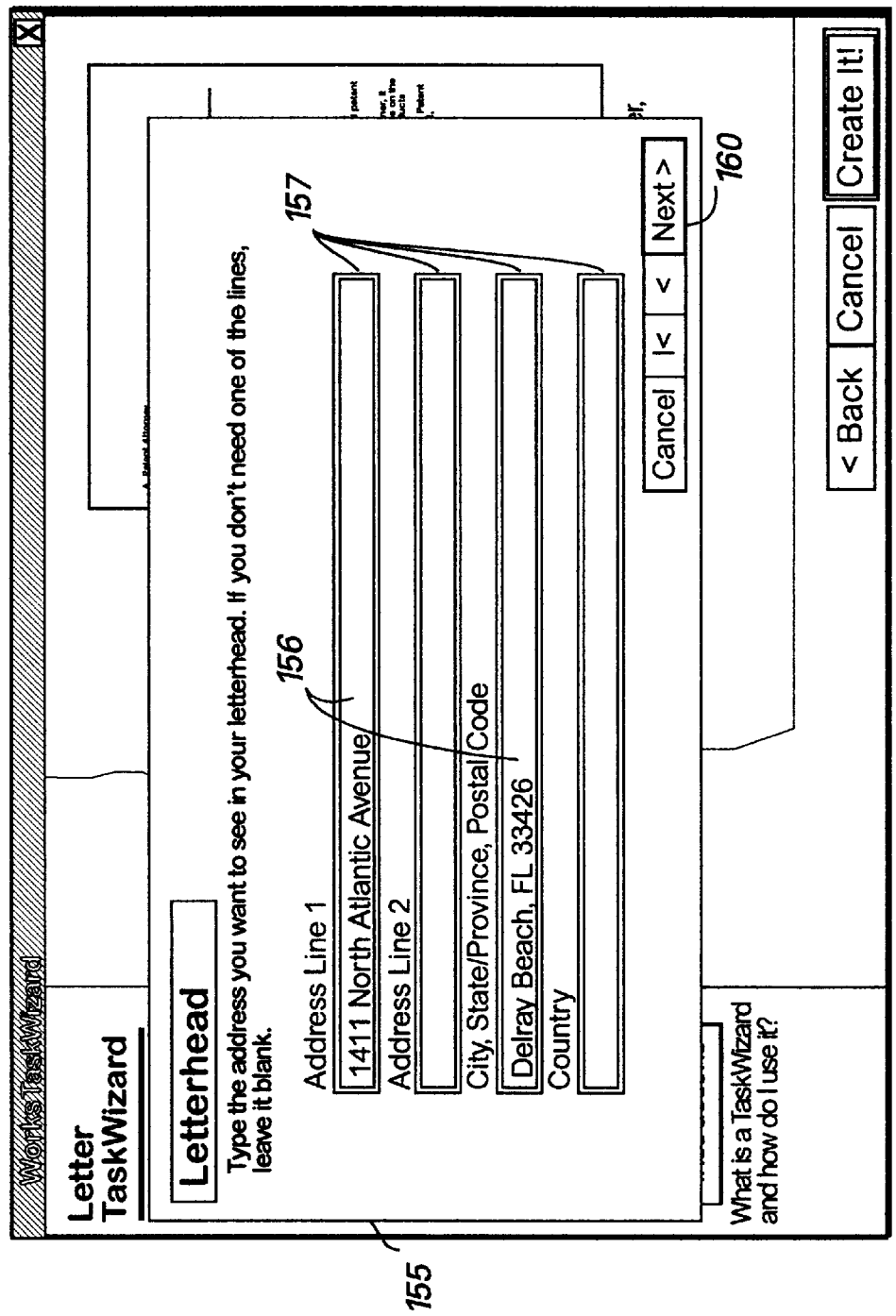
Figure 2K:
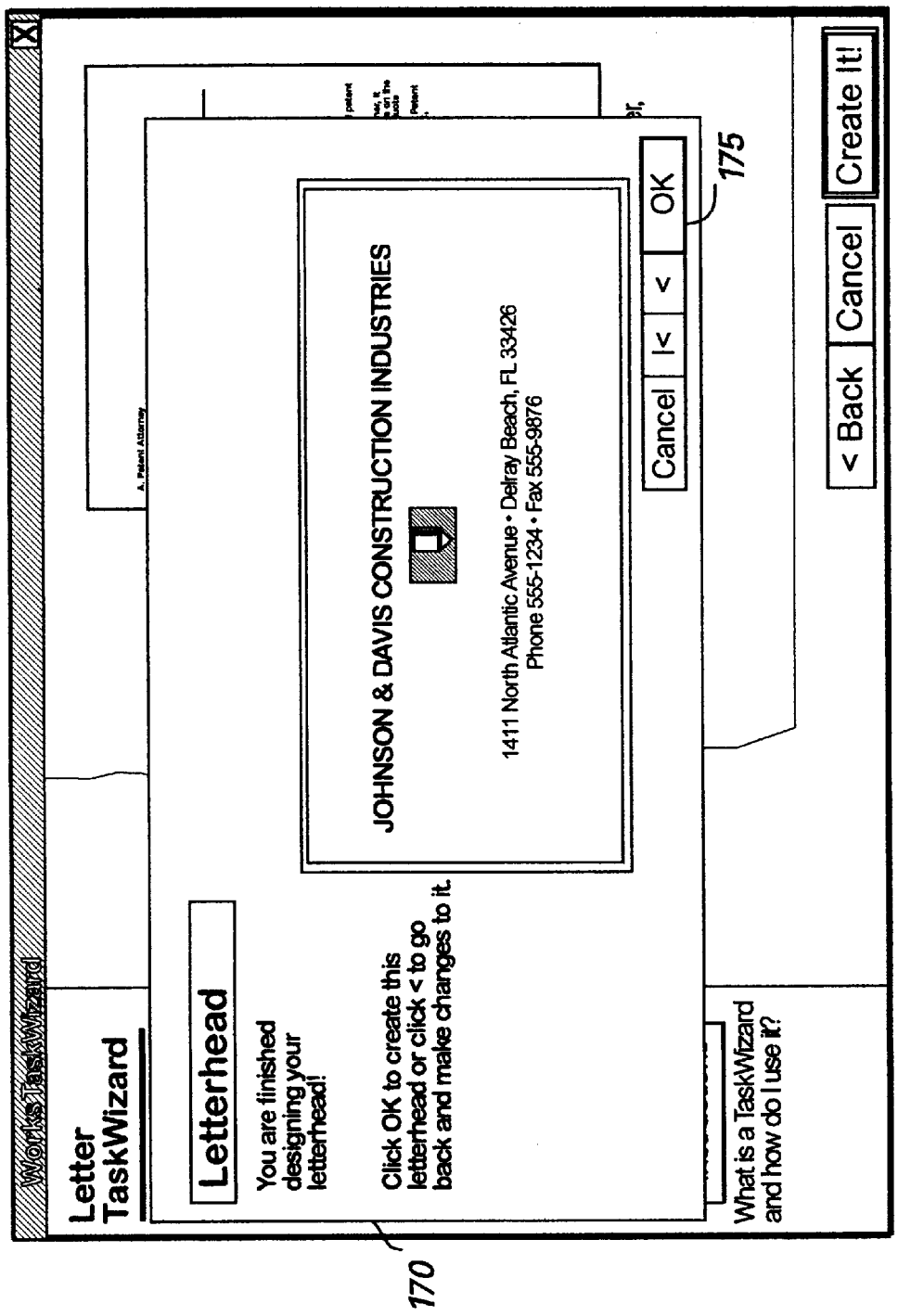
Figure 2L:
Figure 2M:
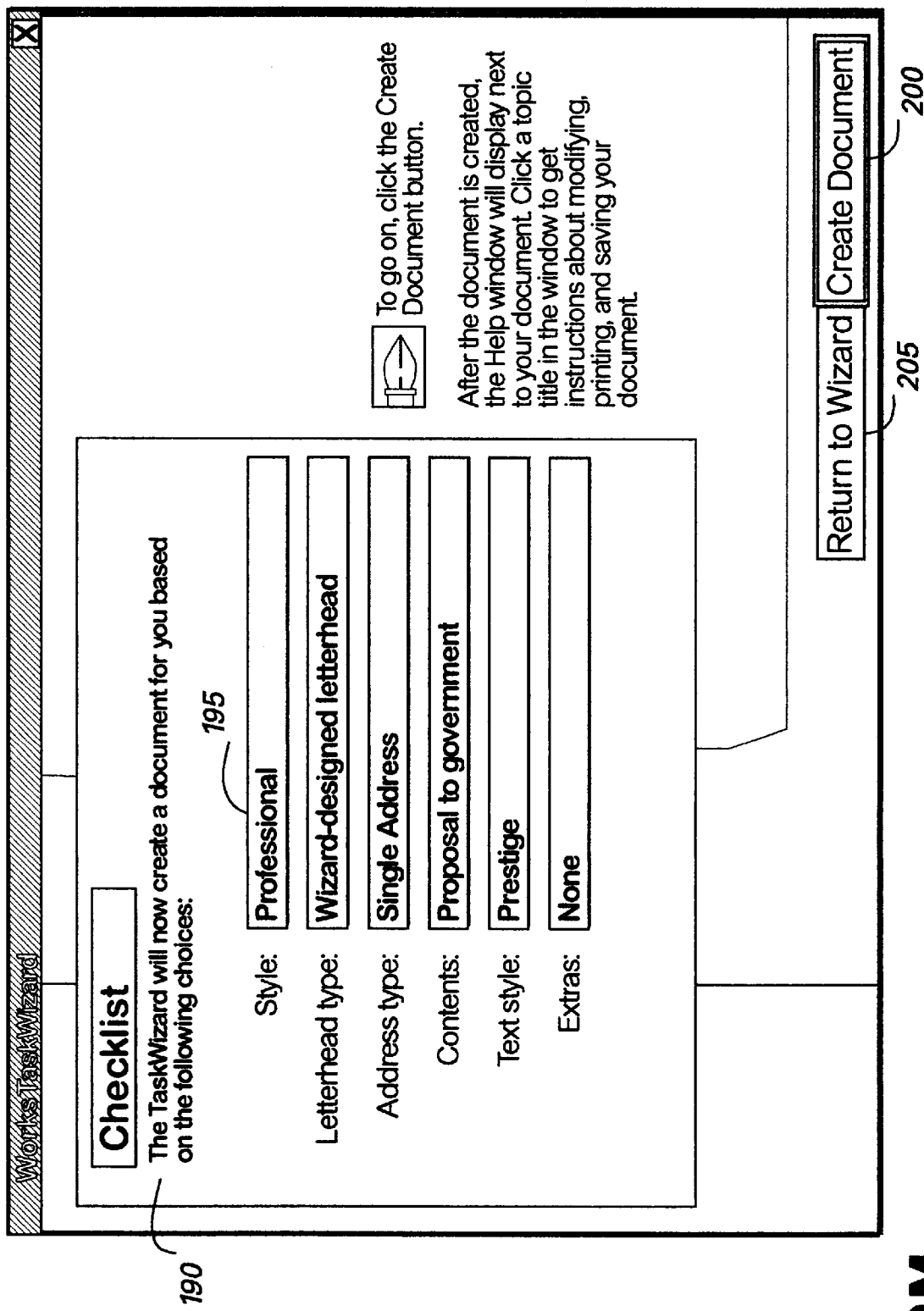
Figure 2N:
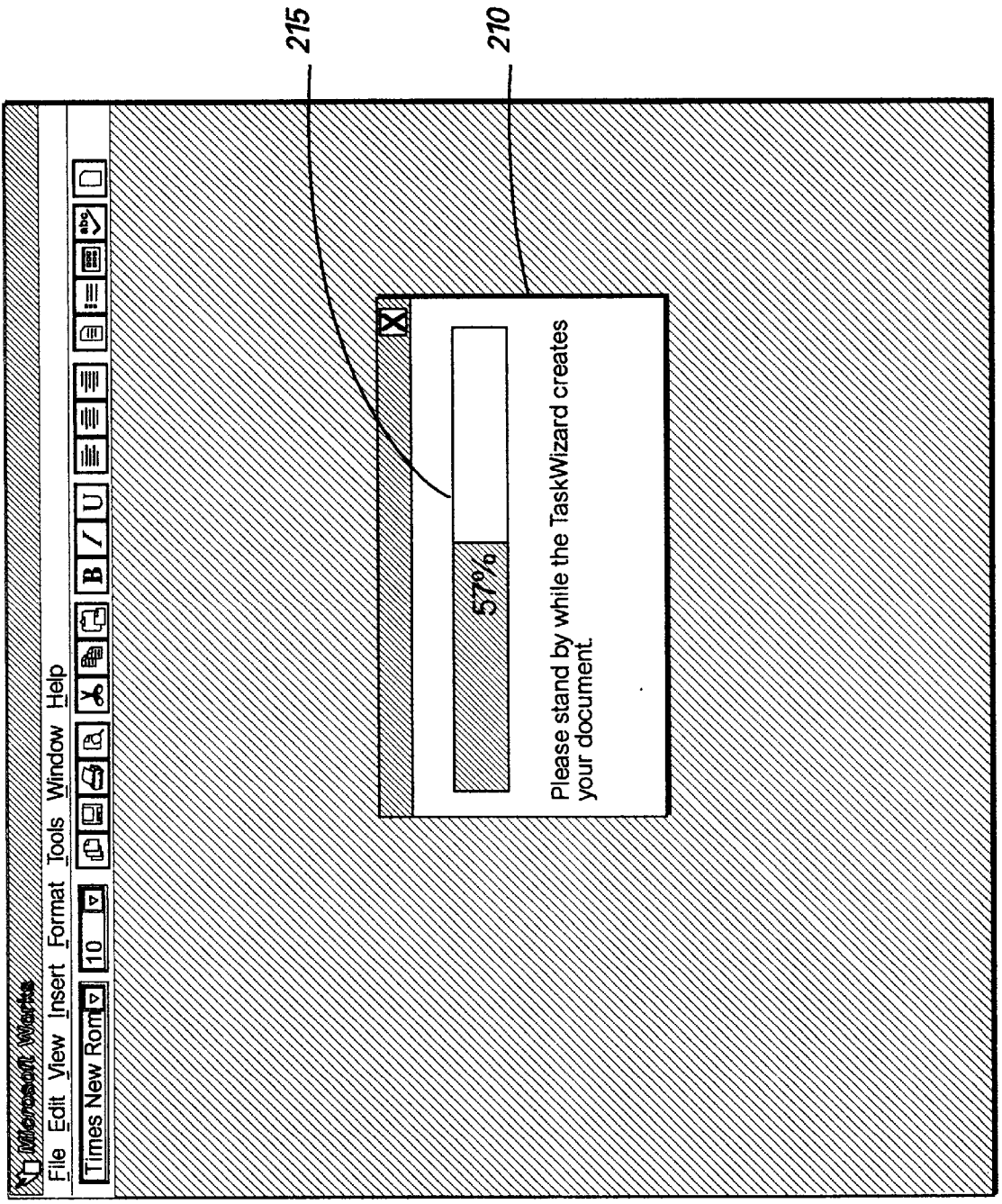

If the "Letterhead" document characteristic 96 from FIG. 2C (or FIG. 2F) is selected, a Letterhead Selection dialog window 140 appears as shown in FIG. 2H. The user selects either a pre-existing letterhead choice 141 or selects a custom design letterhead choice 142 and the "Next" operational selection box 143. A Letterhead Style dialog window 145 as illustrated in FIG. 2I appears with a list of letterhead styles 150 from which the user may choose. The letterhead style chosen from the list of letterhead styles 150 is graphically represented in the letterhead style graphic zone 151. Once the user selects a letterhead style from the list of letterhead styles 150 and chooses the "Next" operational selection box 152, a Letterhead Address dialog window 155 appears as illustrated in FIG. 2J. The desired letterhead address 156 is entered in the appropriate letterhead address data fields 157, and the user selects the "Next" operational selection box 160 to continue. A Letterhead Confirmation dialog window 170 appears as illustrated in FIG. 2K to confirm the user's choices. The user confirms these letterhead choices by selecting the "OK" operational selection box 175, and the preview display 85 of the document is updated to reflect the letterhead choices as illustrated in FIG. 2L. Note the update to the letterhead area 180 of the preview display 85 of the document by comparing FIG. 2L to FIG. 2F.

It will be readily apparent that the user can choose different types of document characteristics to change or alter the document simultaneously updating the preview display 85 of the document to reflect such changes until the user is satisfied with the document by it's appearance in the preview display 85. Accordingly, when the user is satisfied, the user selects the "Create It!" operational selection box 98 to output a customized document containing all of the selected document characteristics currently chosen to an application program. An Output Checklist Confirmation dialog window 190 (FIG. 2M) appears to allow the user to either confirm the list of selected document characteristics 195 by selecting the "Create Document" operational selection box 200 or to return to the wizard dialog window 50 to make additional changes to the document characteristics by selecting the "Return to Wizard" operational selection box 205.

After selecting the "Create Document" operational selection box 200 (FIG. 2M), a Progress Bar window 210 appears as illustrated in FIG. 2N. The progress bar 215 indicates numerically and graphically the progress of creating or outputting the customized document to the application program. Once complete, the customized document 220 appears in the preferred application program 45 as illustrated in FIG. 3.

In the preferred embodiment, a preview display 85 of the document is initially drawn from default document characteristics also referred to as a dataset. A dataset is information about a predetermined set of objects associated with a particular document type. An object is an element of a document represented as a collection of information describing that element with a set of standard operations, such as draw, output, create, and destroy.

More particularly in the preferred embodiment, a list of object attributes within the collection of information describes the object. An example of object attributes is text and textual formatting within a document such as bold, italics, left indent, etc. These attributes are authored into the object when the object was initially created, but can be modified as the wizard runs.

In addition to object attributes, objects in the preferred embodiment also have one or more object flags. There are predefined flags and user defined flags. In the preferred embodiment, there are three predefined flags: Preview Flag, Output Flag, and Visible Flag. Preview Flag and Output Flag determine whether an object can be drawn in either a preview display 85 of a document or a created customized document 220. Visible Flags permit or prohibit an object from being drawn in either the preview or output of the document irrespective of the Preview Flag and Output Flag.

User defined flags are generally object labels which are used to determine when the associated object should be drawn. For example, the author of a greeting object could create an "Informal" flag which would make visible only informal styles of document greetings such as "Hey There!" as opposed to formal styles of document greetings such as "Dear Sir."

Thus, in the preferred embodiment, the dataset is comprised of the number of objects available, the default setting of object attributes and object flags, and predetermined order information concerning what order the objects would be drawn. Object data refers to the object flags and object attribute information within the dataset.

FIG. 4 illustrates the dataset authoring environment of the preferred embodiment where datasets are created for specific document types such as letters, resumes, newsletters, etc. There are two main pieces of code that implement the dataset authoring environment. The first piece of code is the Preview Engine 225. The Preview Engine 225 is a central piece of code that accepts input in the form of a defined collection of objects containing object attributes and flags that make objects associated with those attributes and flags visible or invisible. In the preferred embodiment, the Preview Engine 225 is written as a .vbx file extension for Microsoft Visual Basic as a general purpose piece of code with the ability to be called by any application program. Those skilled in the art will be familiar with three-character file extensions representing a dynamically linked library such as a .vbx file extension.

The Preview Engine 225 is comprised of the Main Object 230, the Flags Object 235, the Draw Object 240, and the Memory Object 245. The Main Object 245 accepts inputs from outside the Preview Engine 225 and directs the other objects within the Preview Engine 225 to perform specific tasks. Each of the objects 250 sets its own flags and attributes. The Flags Object 235 reflects the current state of object flags and object attributes from objects 250. The Draw Object 240 directs objects 250 to draw themselves. The Memory Object 245 loads and saves datasets 255.

The other half of the dataset authoring environment is the Authoring Program 260. The Authoring Program 260 is a program that directs the creation of new datasets by interacting with a user via a graphical user interface and with the Preview Engine 225. In the preferred embodiment, the Authoring Program 260 is written in Microsoft Visual Basic. Within the Authoring Program 260, the Overview Module 265 functions as the graphical user interface prompting a user for input and displaying which objects 250 are available for use. The Object Module 270 modifies the state of the object attributes and object flags by communicating with the Preview Engine 225. The new dataset 255 saved by the Memory Object 245 contains a list of all possible objects 250 for all possible document characteristics desired for a particular document type. A user may modify a pre-existing dataset, whereby a dataset 255 is loaded into the Memory Object 245 of the Preview Engine 225 for modification, or a user may create a brand new dataset without loading anything into the Memory Object 245.

FIG. 5 illustrates the run-time environment of the preferred embodiment. A wizard program 275 acts as a specialized software tool that is launched by an application program 280. In the preferred embodiment, the wizard program 275 is written in Microsoft Visual Basic using named arguments for efficient communication and processing. In the preferred embodiment, the application program 280 is Microsoft Works version 4.0 for Windows 95.

Functionally, the wizard program 275 interacts with the user and with a predetermined set of objects 285 listed in a dataset 290 to simultaneously construct and display a dynamic preview of a document that provides an accurate customized document. The wizard program 275 comprises the same Preview Engine 225 with the same objects as described in the dataset authoring environment from FIG. 4. Form Code 295 is part of the wizard program 275 that provides a general user interface for the wizard program 275. Manipulation Code 300 interacts with the Preview Engine 225 directing setting of object attributes and object flags and reading what objects 285 exist given the specific dataset 290 loaded. FIG. 5 also illustrates direct communication between the application program 280 and the predetermined set of objects 285 listed in a dataset 290 via interprocess communication 305. In the preferred embodiment, the interprocess communication 305 is an "OLE" (Object Linking & Embedding) automation call, a well known standard for interprocess communication with object-oriented applications. Those skilled in the art will be familiar with interprocess communications which include but are by no means limited to "I" interprocess communication. For more comprehensive information regarding "OLE" interprocess communications, the reader may refer to Inside OLE 2, published by Microsoft Press.

FIG. 6 is a flow diagram that illustrates the preferred method of the present invention in terms carried out or visible by the user. The flow diagram summary summarizes the steps that are described in conjunction with the screen printouts of FIGS. 2A–2N and FIG. 3.

Referring now to FIG. 6, the simultaneous construction and preview display method 310 of the present invention begins at step 315 when the user selects the type of document to create. As discussed above, the type of document is selected from a list of document type choices. The user has a wide variety of types of document from which to choose including but not limited to a letter, a resume, and a newsletter. In step 320 the application program launches a specific wizard program or TaskWizard tool to assist the user in creating the selected type of document. In step 325 the wizard program draws an initial preview display of the document with all visible default characteristics. The preview display is drawn as actual text, not as any kind of symbolic representations of text. In step 330 the wizard program displays selections on document characteristics. At this point, the user is able to view the current document characteristics from the preview display and decide whether he or she desires further customization of the document.

In step 335, the wizard program responds by proceeding to step 340 if the user has selected and changed a document characteristic such as switching text to a different font or changing the letterhead of the document. In step 340 the preview display is updated to reflect the changed document characteristic giving the user feedback on the selected and changed document characteristic.

However, if the user does not change any characteristics of the document, step 335 proceeds on to step 345. In step 345, the user chooses whether to output the document to the application program with the current document characteristics or to further change the document characteristics. If further changes to the document characteristics are desired, step 345 proceeds to step 350. At that point, the user must decide in step 350 whether current selections appearing in the wizard dialog box or other selections not appearing in the wizard dialog box are desired. If the current selections appearing in the wizard dialog window are desired, step 350 proceeds back to step 335. However, if other selections not appearing in the wizard dialog box are desired, step 350 proceeds to step 355 where the wizard program displays different selections on document characteristics.

Throughout this process a user can customize the document characteristics and is able to exit at any point in this customization process of constructing and displaying a preview of the document. Returning to step 345, if no further changes to the document characteristics are desired, the user chooses to output the document and proceeds to step 360 where the TaskWizard interface is closed and the customized document is created in the application program with the same document characteristics that were visible in the most recent preview display of the document. Finally, in step 365, the wizard program 275 is exited.

FIG. 7A–7D are flow diagrams illustrating the method 370 of the present invention as implemented by an application program running on a personal computer. As described above, the wizard program interacts with the application program and with a predetermined set of objects. The purpose of these diagrams is to illustrate the interactions between parts of the wizard program, the application program, and the predetermined set of objects.

Figure 7A:
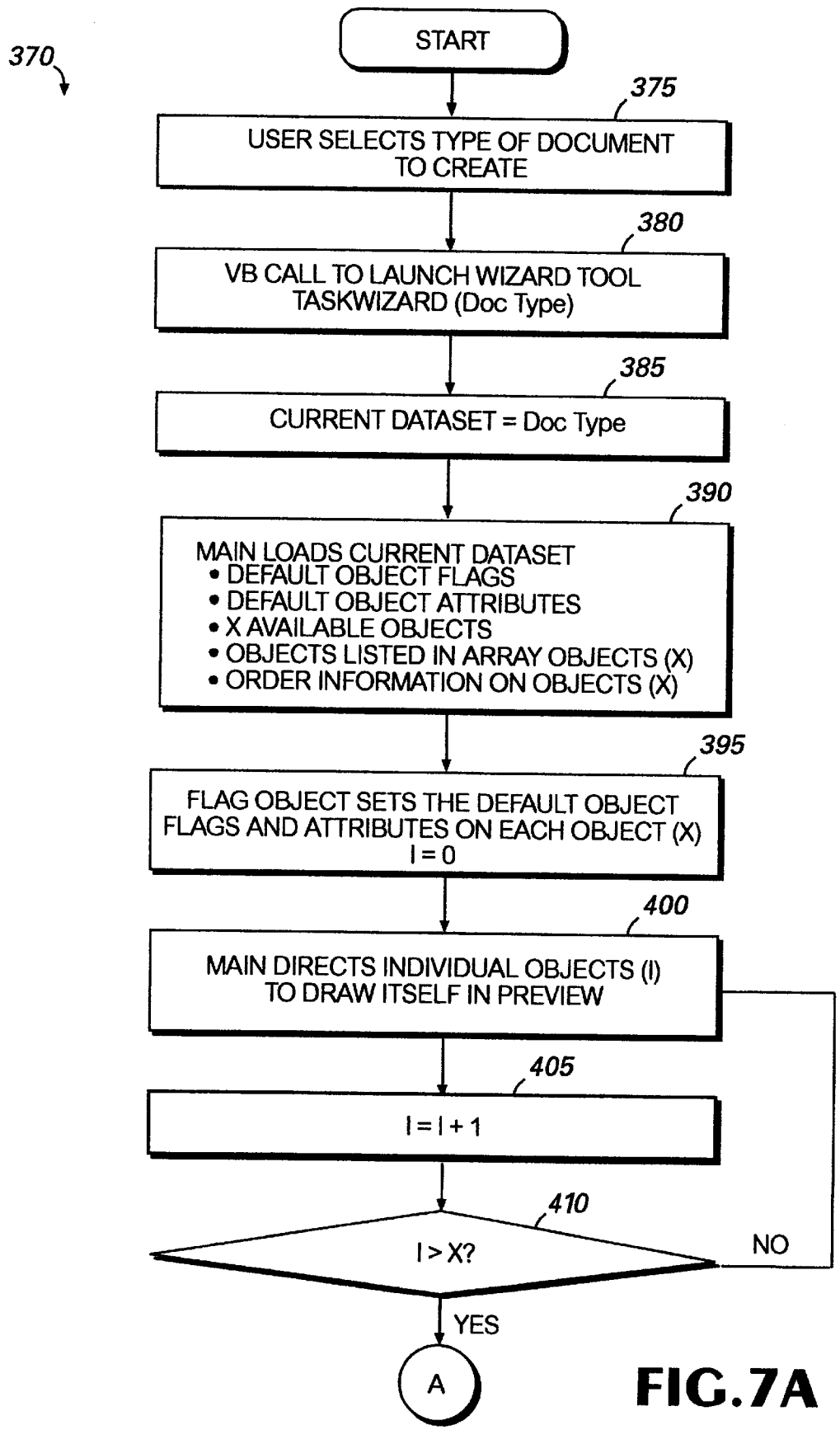
FIG. 7A–7D consist of flow diagrams illustrating the method of the present invention as implemented by an application program running on a personal computer.

Referring now to FIG. 7A, the simultaneous construction and preview display method 370 of the present invention begins at step 375 when the user selects the type of document to create. As discussed above, the type of document is selected from a list of document type choices. In the preferred embodiment, the application program executes CreateProcess, a Microsoft Win32 Application Programming Interface (API) call, to launch the wizard program, "msworks.twz", passing a document type parameter in step 380. This document type parameter is labeled "DocType" for convention in step 380 and corresponds to the type of document that the user selected in step 375. In the actual embodiment, DocType corresponds to parameters labeled "Wizard1" or "Wizard2" through "Wizard 14." For example, if the user chose "letter" as the type of document to create in step 375, then the application launches the wizard program passing the parameter "Wizard2".

In step 385 the wizard program determines the current dataset to load corresponding to the document type parameter, DocType. In step 390 the Main Object of the Preview Engine loads the current dataset. The loaded dataset includes information on the default object attributes, default object flags, X number of available objects described in the array Objects(X), and order information inherently contained in the array Object(X). In the preferred embodiment, the Main Object of the Preview Engine actually asks each object listed in the array Objects(X) to load itself in the interest of efficient execution of the preferred method 370.

In step 395 the Flag Object of the Preview Engine sets the object flags and attributes on each object in Object(X) to it's default setting. Additionally, a counter index, I, is set to 0.

The initial preview display is created by iterations of steps 400–410. This is a process of directing individual objects to draw themselves based upon the associated object attributes and object flags. In steps 400–410, the Main Object directs the individual object described in Object(I) to draw itself in preview on the preview display of the wizard dialog window, increments I, and directs the next object described in Object(I) to draw itself in preview until I is greater than the number of available objects in the dataset.

Note that it is the object itself that performs the drawing function of that particular object. The object relies upon the state of its associated object flags as to whether it draws and relies on its attributes as to what it draws. In the preferred embodiment, objects are capable of object to object queries to determine where to draw. For example, the first object will draw starting from a designated point. The next object will query the prior object where it ended it's previewing so that the next object can begin preview drawing it's contents at that location without any overlap.

Figure 7B:
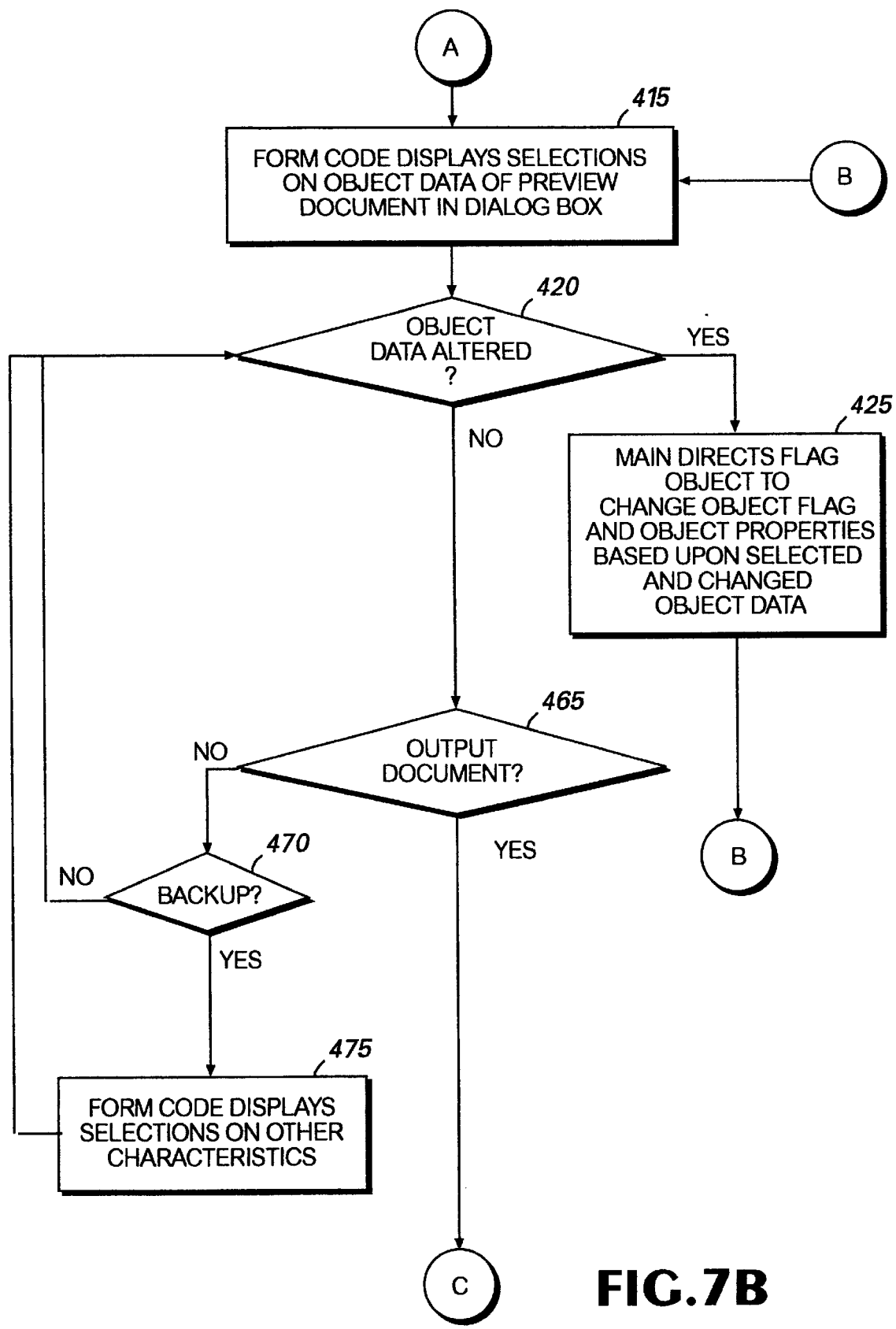
Figure 7C:
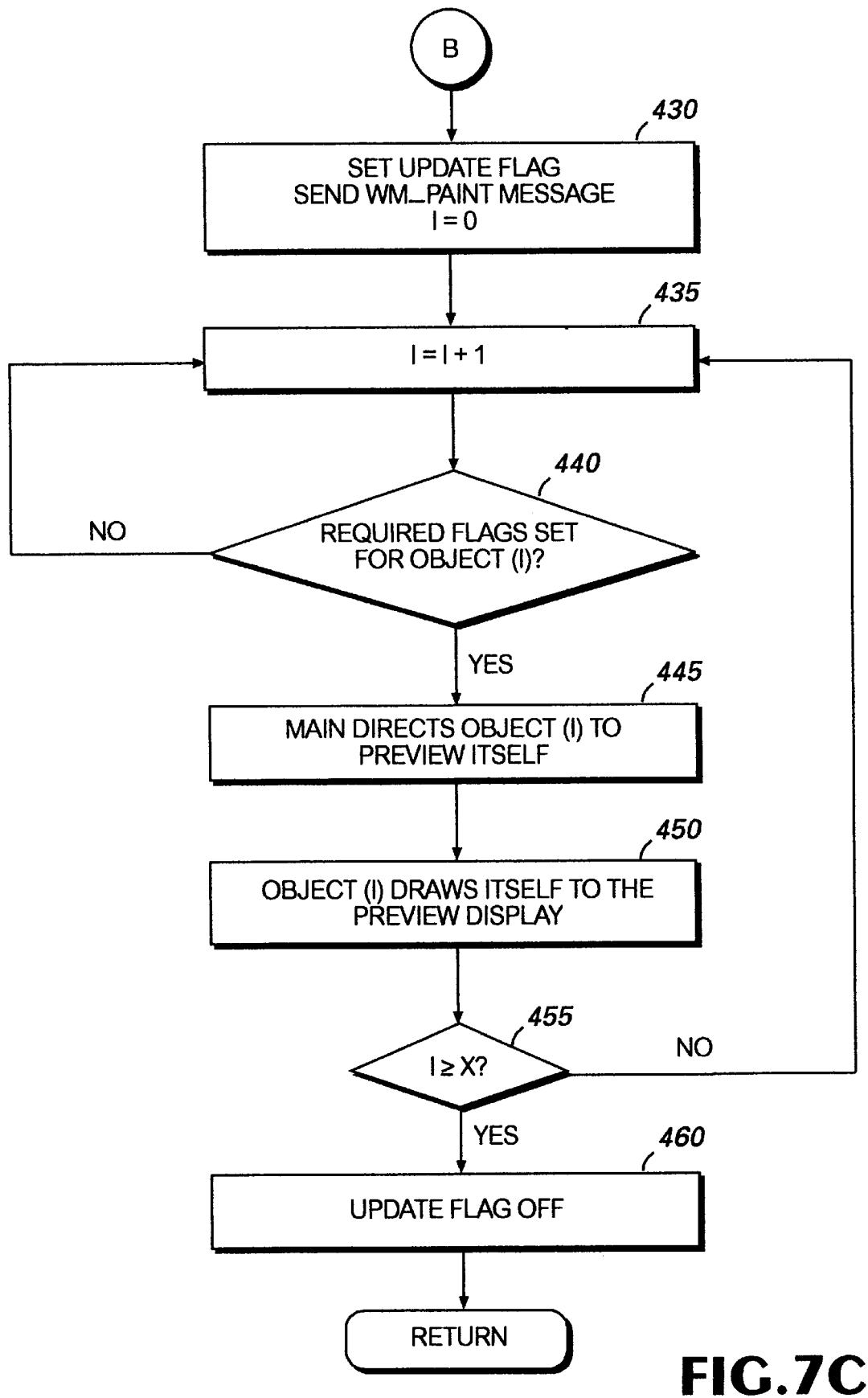

In step 410 when I is greater than the number of available objects in the dataset, all of the objects listed in Object(X) have been drawn creating an initial preview display of the document and the method proceeds to step 415 of FIG. 7B.

Referring now to FIG. 7B, in step 415 Form Code displays selections of object data in a dialog window. These selections of object data correspond to characteristics of the document currently shown in the preview display which can be altered by the user.

In step 420, the wizard program responds to user prompts by proceeding to step 425 if Form Code determines if any object data has been altered. In step 425 Main Object directs the Flag Object to change the appropriate object flags or object properties based upon the altered object data.

In step 430, a counter index, I, is set to 0, and an Update Flag is set indicating the need to update the preview display. In the preferred embodiment, setting the Update Flag invalidates the preview display portion of the wizard dialog window and causes a WM_PAINT message to be sent to Windows by the wizard program. Windows updates the preview display area of the wizard dialog window at the next convenient opportunity. Those skilled in the art will be familiar with operating systems and their various features, which include, but are not limited to the specific WM_PAINT message mentioned above. For more comprehensive information regarding this message, the reader may refer to the Win32 Programmer's Reference published by Microsoft Press.

The updated preview display is then created by iterations of steps 435–455. This is the same process used to create the initial preview display of directing individual objects to draw themselves based upon the associated object attributes and object flags. In step 435, I is incremented, and then in step 440 Main Object determines if all required flags have been set for the object described in Object(I). If the required flags have not been set for the object described in Object(I), then the process returns to step 435. However, if the required flags have been set for the object described in Object(I), then in step 445 the Main Object directs the individual object listed in Object(I) to draw itself in preview on the preview display of the wizard dialog window. Next, in step 450, the object described in Object(I) draws itself. For example, if a "Formal" flag is off and an object requires the "Formal" flag to be set, the object should not be displayed. However, if the "Formal" flag is on, the object would draw itself.

In step 455, if I is greater than or equal to the number of available objects in the dataset, then step 455 proceeds to step 460 where the Update Flag is turned off, and the process returns to step 415 again. However, if I is less than the number of available objects in the dataset, then step 455 returns to step 435 to increment I, and the method proceeds to draw the next previewed object.

Returning to step 420, the wizard program proceeds to step 465 if Form Code determines that no object data has been altered. In step 465, Form Code determines if the user has selected to output the customized document to the application program with the current object data or to further change the object data. If further changes to the object data are indicated, step 465 proceeds to step 470 where Form Code determines if selections of other object data need to be displayed. If selections of other object data do not need to be displayed, step 470 proceeds back to step 420. However, if selections of other object data need to be displayed, step 470 proceeds to step 475 where Form Code displays selections on other object data.

Figure 7D:
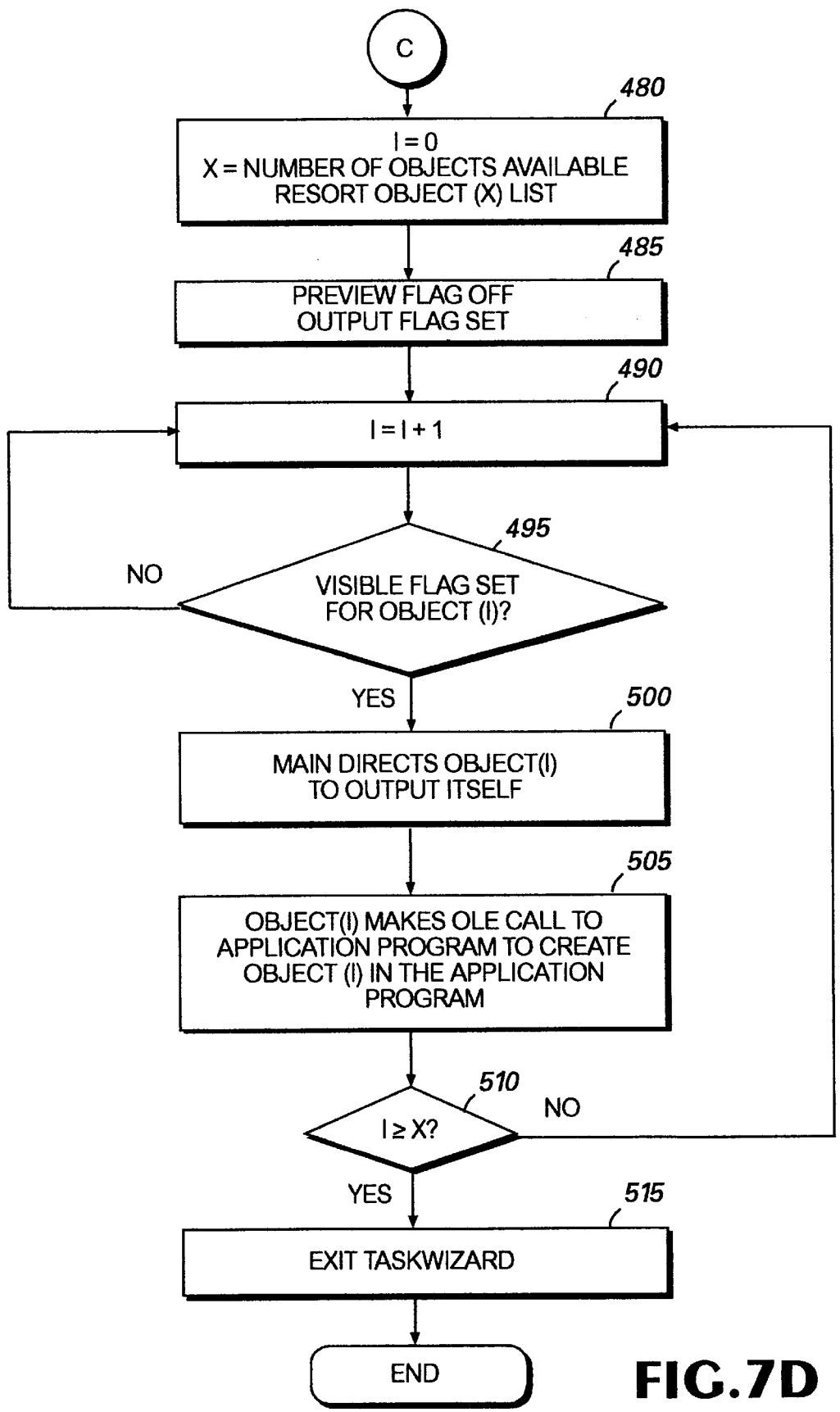

Returning to step 465, if Form Code determines the user has selected to output the customized document to the application program with the current object data, step 465 proceeds to step 480 of FIG. 7D.

Referring now to FIG. 7D, step 480 proceeds to setup for an output of the customized document to the application program. A counter index, I, is set to 0, and the objects described in Object(X) are resorted. In the preferred embodiment, resorting is done to provide a more efficient drawing process for the set of objects described in Object (X). This is based upon flag matches. If a particular object's flag settings match the current global flag settings, then that object is moved to the head of the array Object(X). However, if a particular object's flag settings do not match the current global flag settings, then that object is moved to the end of the array Object(X). In this manner, objects with flag matches are drawn first and once an object is reached in the array Object(X) without a flag match, no further processing of objects listed in the array Object(X) is needed.

The output of the accurate customized document is then created by iterations of steps 485–510. Again, this is the same process used to create the initial preview display and used to update the preview display of directing individual objects to draw themselves based upon the associated object attributes and object flags.

In step 485, Main Object directs Flag Object to toggle the Preview Flag off and the Output Flag on once before the outputting process begins. Thereafter, I is incremented in step 490. Then in step 495, if the Visible Flag has not been set for the object described in Object(I), then the process returns to step 490. However, if the Visible Flag has been set for the object described in Object(I), then in step 500, the Main Object directs the individual object listed in Object(I) to draw itself, but this time the destination is the application program and not the preview display window based upon the Preview and Output Flags. In step 505, the object described in Object(I) draws itself by making an interprocess communication call to the application program. In the preferred embodiment, this interprocess communication is an OLE automation call as discussed previously.

In step 510, if I is greater than or equal to the number of available objects in the dataset, then the wizard program has completed the output of the customized document to the application program, and step 510 proceeds to step 515 where the wizard program is exited and control returns to the application program. However, if I is less than the number of available objects in the dataset, then step 510 returns to step 485 to increment I, and the method proceeds to draw the next object that was previously previewed.

From the foregoing description, it will be appreciated that the present invention provides a system and method for simultaneously constructing and displaying a dynamic preview display of a document wherein the system and method provide an accurate representation of the preview of the document and the customized document itself. The method of the present invention draws an initial preview display of the document. The method then changes characteristics of the preview display of the document and simultaneously updates the preview display of the document after changing any characteristics of the preview display of the document. The method of simultaneously drawing the updated preview display is performed by the same drawing method used to draw the initial preview display of the document. Finally, the method outputs an accurate customized document when finished changing the characteristics of the preview display of the document. The method of outputting the accurate customized document is performed by the same drawing method used to draw the initial preview display of the document and the updated preview of the document.

The present invention also provides a computer system for simultaneously constructing and displaying a dynamic preview of a document. The system provides an accurate representation of the preview display of the document and of the customized document itself. The system includes a central processing unit (CPU), an input device coupled to the CPU for constructing the dynamic preview of the document, and a display device coupled to the CPU for displaying the dynamic preview of the document. The CPU is operative to draw an initial preview display of the document on the display device. The CPU is also operative to change the characteristics of the preview display of the document and simultaneously update the preview display of the document after any changes to the characteristics have been made. Finally, the CPU is operative to output a customized document when no further changes to the preview display of the document are desired. The process of outputting the customized document performed by the CPU being the same process used to draw the initial preview display of the document and update the preview display of the document.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for simultaneously constructing and displaying a dynamic preview of a document that provides an accurate customized document, comprising the steps of:

drawing an initial preview display of said document using a drawing process;

changing the characteristics of said preview display of said document and simultaneously drawing said preview display of said document using said drawing process to present a visual indication of how changing the characteristics of said preview display affects said document; and outputting said document using said drawing process once no further changes to the characteristics of said preview display of said document are desired.

2. A method for simultaneously constructing and displaying a dynamic preview of a document that provides an accurate customized document as recited in claim 1, wherein the characteristics of said preview display of said document include style, textual content, textual attributes, layout, and graphical attributes of said document.

3. A method for simultaneously constructing and displaying a dynamic preview of a document that provides an accurate customized document as recited in claim 1, wherein said steps of drawing an initial preview display, updating said preview display, and outputting said accurate customized document are implemented by a process of drawing actual text of said document corresponding to the characteristics of said preview display of said document.

4. A method for simultaneously constructing and displaying a dynamic preview of a document that provides an accurate customized document as recited in claim 1, wherein said process of drawing is performed by directing a plurality of objects to draw themselves, said objects containing current information concerning the characteristics of said preview display of said document, each of said objects being capable of drawing itself.

5. A method for simultaneously constructing and displaying a dynamic preview of a document that provides an accurate customized document, comprising the steps of:
   (a) loading a dataset containing object data corresponding to a predetermined document type;
   (b) drawing an initial preview display of said document corresponding to said dataset using a drawing process, said initial preview display corresponding to said object data;
   (c) altering said object data;
   (d) simultaneously drawing said preview display of said document using said drawing process, after altering said object data, said preview display corresponding to said altered object data; and
   (e) outputting said document once no further changes to said object data are desired using said drawing process so that the appearance of said document is consistent with the appearance of said preview display.

6. A method for simultaneously constructing and displaying a dynamic preview of a document that provides an accurate customized document as recited in claim 5, further comprising the step of:
   (f) repeating said steps (c), (d), and (e) until no further changes to said object data are desired.

7. A method for simultaneously constructing and displaying a dynamic preview of a document that provides an accurate customized document as recited in claim 5, further comprising the step of presenting a prompt to solicit alterations to said object data after said step of drawing said initial preview display.

8. A method for simultaneously constructing and displaying a dynamic preview of a document that provides an accurate customized document as recited in claim 5, wherein said object data contained in said dataset comprises default object flags and default object attributes for a predetermined set of objects available for use with said document.

9. A method for simultaneously constructing and displaying a dynamic preview of a document that provides an accurate customized document as recited in claim 8, wherein said object data contained in said dataset further comprises a predetermined ordered listing of said set of objects available for use with said document.

10. A method for simultaneously constructing and displaying a dynamic preview of a document that provides an accurate customized document as recited in claim 8, wherein said dataset containing said object data is created by the steps of:
   determining what objects are available for use for said predetermined document type,
   determining what object attributes are desirable as default object attributes on said available objects for said predetermined document type,
   determining what object flags are desirable as default object flags on said available objects for said predetermined document type, and
   saving said default object attribute settings and said default object flag settings into said dataset, whereby upon recalling said dataset, said available objects are configured according to said saved settings.

11. A method for simultaneously constructing and displaying a dynamic preview of a document that provides an accurate customized document as recited in claim 5, wherein said drawing process is performed by drawing actual text of said document corresponding to the current state of said object data.

12. A method for simultaneously constructing and displaying a dynamic preview of a document that provides an accurate customized document as recited in claim 5, wherein said drawing process is implemented by directing a predetermined set of objects to individually draw themselves, said objects being capable of drawing themselves and said objects containing current information concerning said object data.

13. A method for simultaneously constructing and displaying a dynamic preview of a document that provides an accurate customized document as recited in claim 12, wherein said drawing process is further implemented by directing said predetermined set of objects to individually draw themselves in a predetermined order.

14. A method for simultaneously constructing and displaying a dynamic preview of a document that provides an accurate customized document as recited in claim 6, wherein said step of altering said object data comprises the steps of:
   in response to receiving a selected object attribute, altering said selected object attribute; in response to receiving a selected object flag, toggling said selected object flag; and in response to receiving an indication to make a new object visible in said preview display, setting a preview flag on said new object.

15. A method for simultaneously constructing and displaying a dynamic preview of a document that provides an accurate customized document as recited in claim 8, wherein said objects can communicate with other objects within said predetermined set of objects to relatively locate each object in comparison to other objects within said predetermined set of objects during said drawing process.

16. A method for simultaneously constructing and displaying a dynamic preview of a document that provides an accurate customized document as recited in claim 8, wherein said currently previewed objects interact with said application program using an interprocess communication in said step of outputting a customized document.

17. A method for constructing a customized document having a plurality of selected document characteristics by updating a preview display of the document as each selected document characteristic is applied to the document, comprising the steps of:
   (a) drawing an initial preview display of the document using a plurality of default document characteristics;
   (b) in response to receiving one of the selected document characteristics, modifying one of the default document characteristics to correspond to one of the selected document characteristics; and simultaneously drawing an updated preview display of the document using one of the selected document characteristics; and (c) outputting the document having the selected document characteristics.

18. The method of claim 17, wherein the steps of (a) drawing the initial preview display, (b) drawing the updated preview display, and (c) outputting the document are performed using a common drawing process to present a visual indication of how modifying one of the default document characteristics affects the document.

19. The method of claim 17, further comprising the step of repeating step (b) for each of the selected document characteristics.

20. A computer-readable medium having computer executable instructions for constructing and displaying a dynamic preview of a customized document, comprising the steps of:

drawing an initial preview display of a default document using a drawing process that shows actual text of the document and a plurality of default document characteristics applied to the document;

customizing the document by simultaneously changing a selected one of the default document characteristics to a customized document characteristic and drawing a modified preview display of the document using the drawing process that shows actual text of the document and the customized document characteristic applied to the document; and outputting the document using the drawing process.

21. The computer-readable medium of claim 20, wherein the drawing process used to draw the modified preview display of the document is the same drawing process used to output the document, so that the modified preview display accurately reflects the document.

22. A method for creating a customized document using selected document characteristics that dynamically updates a preview display of the document in response to receiving the selected document characteristics, comprising the steps of:

displaying an initial preview display of the document;

receiving a first one of the selected document characteristics while displaying the initial preview display;

in response to receiving the first selected document characteristic, displaying a first preview display of the document, the first preview display showing the first selected document characteristic applied to the document;

receiving a second one of the selected document characteristics while displaying the initial preview display;

in response to receiving the second selected document characteristic, displaying a second preview display of the document, the second preview display showing the second selected document characteristic applied to the document; and creating the document having the first selected document characteristic and the second selected document characteristic.

23. The method of claim 22, wherein the step of displaying the first preview display, the step of displaying the second preview display, and the step of outputting the document are performed by the same drawing process so that the first preview display accurately reflects the first selected document characteristic applied to the document and the second preview display accurately reflects the second selected document characteristic applied to the document.

24. The method of claim 22, wherein the initial preview display of the document shows default document characteristics applied to the document.

25. An interactive method for creating a customized document based upon a selected one of a plurality of predetermined document types, wherein a preview display of the document is updated each time a document characteristic of the document is customized, comprising the steps of:

drawing a default preview display of a default document having the selected document type and having a plurality of default document characteristics using a drawing process;

replacing a first default document characteristic with a first customized document characteristic;

updating the default preview display by drawing a first preview display using the drawing process showing the first customized document characteristic applied to the document;

replacing a second default document characteristic with a second customized document characteristic;

updating the first preview display by drawing a second preview display using the drawing process showing the first customized document characteristic and the second customized document characteristic applied to the document; and outputting the document to an application program using the drawing process, the document having the first document characteristic and the second document characteristic.

26. The method of claim 25, further comprising the steps of:

replacing the second customized document characteristic with a third customized document characteristic; and updating the second preview display by drawing a third preview display using the drawing process showing the first customized document characteristic and the third customized document characteristic applied to the document.

27. The method of claim 25, wherein the drawing process draws actual text and actual document characteristics of the document so that the first preview display and the second preview display are accurate representations of the document.

\* \* \* \* \*